(12) United States Patent
Ueda et al.

(10) Patent No.: US 8,660,055 B2
(45) Date of Patent: Feb. 25, 2014

(54) PSEUDO HUB-AND-SPOKE WIRELESS AUDIO NETWORK

(75) Inventors: Joji Ueda, Cambridge, MA (US); Ronald N. Isaac, Shrewsbury, MA (US)

(73) Assignee: Bose Corporation, Framingham, MA (US)

( * ) Notice: Subject to any disclaimer, the term of this patent is extended or adjusted under 35 U.S.C. 154(b) by 1578 days.

(21) Appl. No.: 11/981,985

(22) Filed: Oct. 31, 2007

(65) Prior Publication Data
US 2009/0109894 A1    Apr. 30, 2009

(51) Int. Cl.
*H04B 7/14* (2006.01)
*H04W 4/00* (2009.01)
*H04L 12/66* (2006.01)
*H04B 3/00* (2006.01)
*H04R 25/00* (2006.01)

(52) U.S. Cl.
USPC ............ 370/315; 370/338; 370/356; 381/80; 381/313

(58) Field of Classification Search
USPC ....................................... 381/93–98
See application file for complete search history.

(56) References Cited

U.S. PATENT DOCUMENTS

| | | | |
|---|---|---|---|
| 5,991,640 A | 11/1999 | Lilja et al. | |
| 7,062,238 B2 | 6/2006 | Glaza | |
| 7,482,951 B1 | 1/2009 | Brungart et al. | |
| 7,509,178 B2 * | 3/2009 | Logan et al. | 700/94 |
| 2002/0197955 A1 | 12/2002 | Witkowski et al. | |
| 2003/0045265 A1 | 3/2003 | Huang et al. | |
| 2003/0223409 A1 | 12/2003 | Wiebe | |
| 2004/0097263 A1 | 5/2004 | Katayama et al. | |
| 2004/0121748 A1 | 6/2004 | Glaza | |
| 2005/0009574 A1 | 1/2005 | Lin | |
| 2005/0064835 A1 | 3/2005 | Gusler et al. | |
| 2005/0135297 A1 | 6/2005 | Katayama | |
| 2005/0286546 A1 | 12/2005 | Bassoli et al. | |
| 2006/0046656 A1 | 3/2006 | Yang | |
| 2006/0072525 A1 | 4/2006 | Hillyard et al. | |
| 2006/0270395 A1 | 11/2006 | Dhawan et al. | |
| 2006/0287745 A1 * | 12/2006 | Richenstein et al. | 700/94 |
| 2007/0087686 A1 | 4/2007 | Holm et al. | |
| 2007/0103723 A1 | 5/2007 | Wolcott et al. | |

(Continued)

FOREIGN PATENT DOCUMENTS

| | | |
|---|---|---|
| EP | 1052834 | 11/2000 |
| EP | 1460769 | 9/2004 |

(Continued)

OTHER PUBLICATIONS

International Preliminary Report on Patentability dated Feb. 25, 2010 for Appl. No. PCT/US2008/080594.

(Continued)

*Primary Examiner* — Brandon Renner

(57) ABSTRACT

An apparatus induces a first wireless device to transmit audio-related data to both the apparatus and a second wireless device by providing the first wireless device with a false indication of the apparatus being capable of performing an audio function that the apparatus is incapable of performing so as to enable the second wireless device to receive the audio-related data simultaneously with the apparatus, and wherein the second wireless device cooperates with the apparatus to leave the first wireless device unaware of the simultaneous receipt of the audio-related data by the second wireless device.

22 Claims, 8 Drawing Sheets

(56) References Cited

U.S. PATENT DOCUMENTS

| | | | |
|---|---|---|---|
| 2007/0129006 A1 | 6/2007 | Goldberg et al. | |
| 2007/0136637 A1* | 6/2007 | Majima | 714/758 |
| 2007/0160225 A1 | 7/2007 | Seydoux | |
| 2007/0217400 A1* | 9/2007 | Staples | 370/356 |
| 2007/0223725 A1 | 9/2007 | Neumann et al. | |
| 2008/0114819 A1* | 5/2008 | vom Scheidt et al. | 707/204 |
| 2008/0159560 A1* | 7/2008 | Song et al. | 381/94.1 |

FOREIGN PATENT DOCUMENTS

| | | |
|---|---|---|
| WO | 2006006910 A1 | 1/2006 |
| WO | 2007103723 | 9/2007 |
| WO | 2007117788 | 10/2007 |

OTHER PUBLICATIONS

International Search Report and Written Opinion dated Feb. 23, 2009 for International Appl. No. PCT/US2008/080594.
Ling-Jyh, Chen et al: "Audio Streaming Over Bluetooth : An Adaptive ARQ Timeout Approach", Distributed Computing Systems Workshops, 2004. Proceedings. 24th International Conference on Hachioji, Tokyo, Japan; Mar. 23-24, 2004. pp. 196-201.
International Search Report and Written Opinion dated Nov. 25, 2008 for International Appl. No. PCT/US2008/68909, filed Jul. 11, 2008.
International Search Report and Written Opinion dated Mar. 17, 2009 for International Appl. No. PCT/US2008/080595.
International Search Report and Written Opinion dated Mar. 17, 2009 for International Appl. No. PCT/US2008/080592.
International Preliminary Report on Patentability dated May 14, 2010 for Appl. No. PCT/US2008/080595.
EP Office Action dated May 31, 2010 for EP Appl. No. 08796158.7-1246.
International Preliminary Report on Patentability dated Oct. 14, 2009 for PCT/US2008/069809.
International Report on Patentability dated May 14, 2010 for Appl. No. PCT/US2008/080592.
EP Office Action dated Mar. 8, 2011 for EP Application No. 08844762.8-1525.
EP Office Action dated Mar. 17, 2011 for EP Application No. 08843399.0-1525.

* cited by examiner

PSEUDO HUB-AND-SPOKE WIRELESS AUDIO NETWORK

FIELD

This description relates to sharing audio through wireless devices.

BACKGROUND

It has become commonplace to use devices employing point-to-point wireless communications technologies to create a personal area network in the vicinity of a user of personal electronic devices carried about by the user (referred to by some as a "piconet") to convey audio from one of those personal electronic devices to one or both ears of the user, as in the case of the playback of audio stored on an audio playing device to the user. It has also become commonplace to additionally convey audio from the user to one of those personal electronic devices, as in the case of cell phone in which the user engages in telephonic communication through such point-to-point wireless communications with that device. Among the forms of such point-to-point wireless communications being used for such purposes are those that conform to the widely used "Bluetooth" specification promulgated by the Bluetooth Special Interest Group of Bellevue, Wash.

Wireless communications conforming to the Bluetooth specification have been in use for some time to wirelessly convey two-way audio between cell phones and so-called "earpieces" that incorporate both an acoustic driver to output audio to an ear of a user and a microphone to receive audio from the mouth of the user. More recently, there has been a growing emergence of audio playing devices employing wireless communications conforming to the Bluetooth specification to wirelessly convey one-way audio from those devices to one or more acoustic drivers to output audio to one or both ears of a user.

Unfortunately, despite the growing acceptance of such point-to-point wireless communications for the conveying of audio between personal electronic devices, the point-to-point nature, the procedures required to securely establish wireless connections, and the conversions of audio between various analog and digital forms have presented various difficulties. Those difficulties include various impediments to providing audio to both ears of a user, allowing a user to easily transition from one choice of acoustic driver and/or microphone to another, and sharing audio with a personal electronic device carried by another user.

SUMMARY

An apparatus induces a first wireless device to transmit audio-related data to both the apparatus and a second wireless device by providing the first wireless device with a false indication of the apparatus being capable of performing an audio function that the apparatus is incapable of performing so as to enable the second wireless device to receive the audio-related data simultaneously with the apparatus, and wherein the second wireless device cooperates with the apparatus to leave the first wireless device unaware of the simultaneous receipt of the audio-related data by the second wireless device.

In one aspect, the invention features an apparatus that includes a processor, a transceiver accessible to the processor and configured to engage in wireless communications with a first wireless device, a storage accessible to the processor and having a routine stored therein comprising a sequence of instructions. When the sequence of instructions are executed by the processor, the processor is caused to operate the transceiver to transmit to the first wireless device across a first wireless link formed with the first wireless device a false indication that the apparatus is capable of performing at least one audio function of which the apparatus is not capable of performing to induce the first wireless device to transmit a piece of audio-related data across the first wireless link to the apparatus, operate the transceiver to receive the piece of audio-related data across the first wireless link, and operate the transceiver to wirelessly communicate with a second wireless device to coordinate a substantially simultaneous receipt of the piece of audio-related data by the second wireless device.

Implementations of the invention may include one or more of the following features. Implementations could include the processor being further caused to form a second wireless link between the apparatus and the second wireless device, to transmit information concerning the first wireless link to the second wireless device, to exchange a synchronization signal with the second wireless device to synchronize audible output of the audio-related data between the apparatus and the second wireless device, and/or to transmit an error signal to the first wireless device causing the first wireless device to retransmit the piece of audio-related data in response to receiving an indication from the second wireless device of an error in receiving the piece of audio-related data. Implementations could include the piece of audio-related data being a piece of audio having a first audio channel and a second audio channel, where the first audio channel is audibly output by the apparatus and the second audio channel is audibly output by the second wireless device, and where the apparatus and the second wireless device may each be an earphone. Implementations could include the piece of audio-related data being a piece of audio having a first audio channel and a second audio channel, where the first audio channel is audibly output by the second wireless device and the second audio channel is audibly output by a third wireless device, and where the second and third wireless devices are each an earphone.

In one aspect, the invention features an apparatus that includes a processor, a transceiver accessible to the processor and configured to engage in wireless communications with a first wireless device and a second wireless device, a storage accessible to the processor and having a routine stored therein comprising a sequence of instructions. When the sequence of instructions are executed by the processor, the processor is caused to operate the transceiver to receive an indication that the first wireless device has successfully induced the second wireless device to transmit a piece of audio-related data as a result of the first wireless device transmitting a false indication that the first wireless device is capable of performing at least one audio function of which the first wireless device is not capable of performing, operate the transceiver to receive information from the first wireless device concerning a first wireless link formed between the first and second wireless devices that enables the apparatus to receive a piece of audio-related data substantially simultaneously with first wireless device as the second wireless device transmits the piece of audio-related data across the first wireless link, and operate the transceiver to receive the piece of audio-related data substantially simultaneously with the first wireless device.

Implementations of the invention may include one or more of the following features. Implementations could include the apparatus exchanging a synchronization signal with the first wireless device to synchronize the audible output of portions of the piece of audio-related data between the apparatus and the first wireless device where the piece of audio-related data is a piece of audio data having multiple audio channels. Implementations could include the apparatus exchanging a synchronization signal with the first wireless device to synchronize the audible output of portions of the piece of audio-related data between the apparatus and a third wireless device where the piece of audio-related data is a piece of audio data having multiple audio channels. Further, the implementations could include one or more of the apparatus, the first wireless device and the above-mentioned third wireless device each being an earphone.

In one aspect, the invention features a method that includes transmitting to a first wireless device across a first wireless link formed with the first wireless device a false indication that an apparatus is capable of performing at least one audio function of which the apparatus is not capable of performing to induce the first wireless device to transmit a piece of audio-related data across the first wireless link to the apparatus, receiving the piece of audio-related data across the first wireless link, and wirelessly communicating with a second wireless device to coordinate a substantially simultaneous receipt of the piece of audio-related data by the second wireless device.

Implementations of the invention may include one or more of the following features. Implementations could include forming a second wireless link with the second wireless device, transmitting information concerning the first wireless link to the second wireless device to enable the simultaneous receipt of the piece of audio-related data by the second wireless device, signaling the first wireless device to retransmit the piece of audio-related data in response to receiving from the second wireless device an indication of an error in the substantially simultaneous receipt of the piece of audio-related data by the second wireless device, and/or wirelessly communicating with a third wireless device to coordinate a substantially simultaneous receipt of the piece of audio-related data by the third wireless device.

DESCRIPTION

Figure 1:
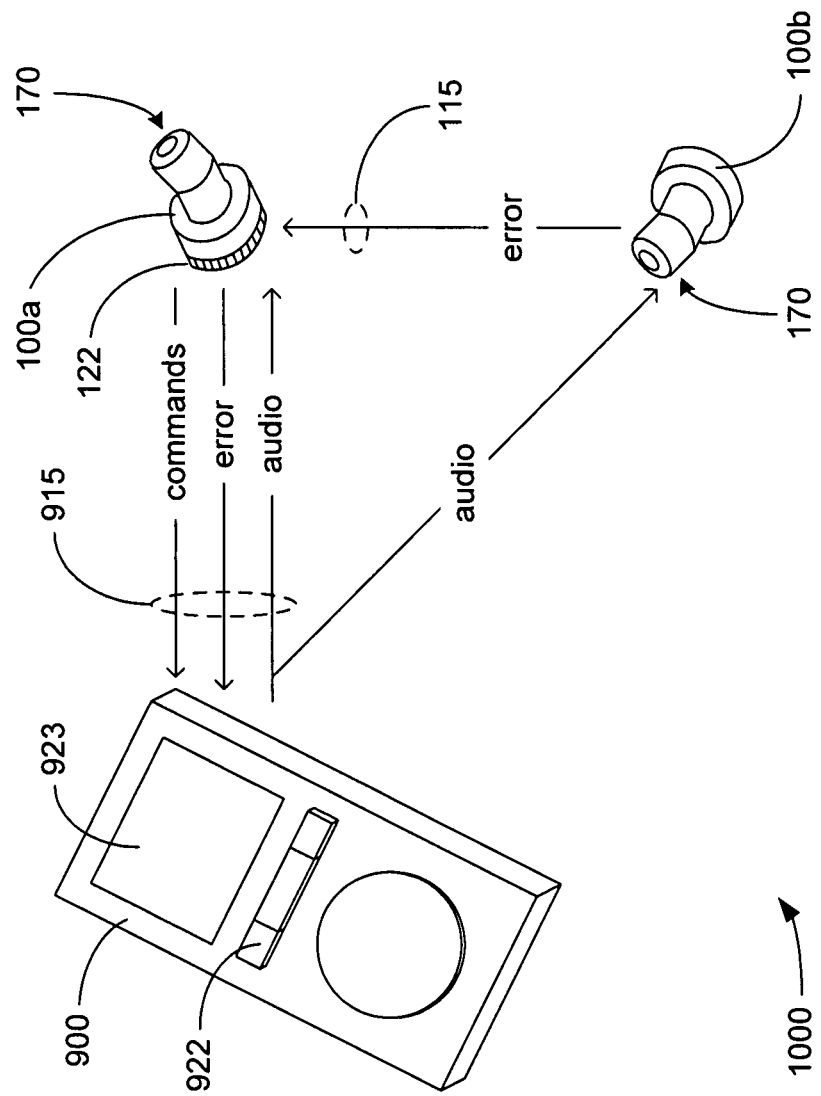
FIG. 1 is a block diagram of a wireless network incorporating multiple wireless audio devices and a personal electronic device.

FIG. 1 depicts a network 1000 in which audio is transferred among three personal electronics devices, specifically, a personal electronic device 900 and a pair of wireless audio devices 100a and 100b. The network 1000 is of a pseudo hub-and-spoke topology in which the personal electronic device 900 is presented with false indications of being in wireless communications to transfer audio solely to the wireless audio device 100a across a single wireless point-to-point link 915, but with the purpose of inducing the personal electronic device 900 to also transfer the audio to the wireless audio device 100b. In essence, the personal electronic device 900 is induced into occupying the hub position with each of the wireless audio devices 100a and 100b occupying spoke positions. Another wireless point-to-point link 115 is formed between the wireless audio devices 100a and 100b for network management purposes and to coordinate actions between them concerning receiving audio from the personal electronic device 900 as part of maintaining the pseudo hub-and-spoke topology. The technology on which either of the links 115 and 915 are based may be of any of a wide variety of types employing RF signals, infrared signals, or any of a variety of other forms of wireless transmission media, and the technologies used between the links 115 and 915 may differ. Where one or both of the links 115 and 915 employ RF signals, one or both may at least partially conform to the Bluetooth specification, or to any of a variety of other specifications for wireless networking as would be appropriate in shortness of range and limitation of power consumption for use between personal electronic devices carried by a user.

The personal electronic device 900 may be of any of a variety of types of personal electronic device, including and not limited to, various multimedia, information handling and/or communications devices such as a cell phone, a digital music player (e.g., a typical MP3 music file player), portable camera with audio playback functionality, a personal data assistant (PDA), or a personal navigation device. At a minimum, the personal electronic device 900 is capable of providing audio in digital form across a wireless point-to-point link. This audio may be any of a variety of forms of audio, including and not limited to, digitized music stored on the personal electronic device 900, and audio received by the personal electronic device 900 from an RF transmission (e.g., FM or satellite radio). The personal electronic device 900 may also be capable of receiving remote control commands from across a wireless point-to-point link to enable the remote control of various functions of the personal electronic device 900, including commands related audio (e.g., commands to stop, pause, play, fast-forward, adjust a volume, change a channel, etc.). The commands may correspond to functions accessible through a manually-operable control 922 incorporated into the personal electronic device 900. The personal electronic device 900 may also be capable of transmitting textual or other data beyond audio, including song titles, track titles, time, date, GPS coordinates, RF signal strength, etc. These various pieces of data may correspond to data displayable on an indicator 923 incorporated into the personal electronic device 900.

The wireless audio devices 100a and 100b are meant to wirelessly receive audio and enable output of that audio in audible form. Although the pair of wireless audio devices 100a and 100b are depicted as being a pair of earbuds (also commonly referred to as "in-ear" headphones), this is intended to be illustrative of one form of device, and each of the pair of wireless audio devices 100a and 100b could be any of a number of types of devices capable of audibly outputting wirelessly-received audio (e.g., wireless speakers). Each of the wireless audio devices 100a and 100b incorporates at least one acoustic driver 170 (e.g., an electromagnetic speaker, a piezo-electric electric element, an electrostatic speaker, etc.), and each may further incorporate a manually-operable control 122 and/or an indicator (not shown). Where a given one of the wireless audio devices 100a and 100b incorporates the control 122, the control 122 may be operable to enable a user to remotely control the personal electronic device 900 and/or the other of the wireless audio devices 100*a* and 100*b*. Where a given one of the wireless audio devices 100*a* and 100*b* incorporates an indicator, the indicator may enable non-audio data to be displayed to a user.

Although the personal electronic device 900 may employ any of a variety of technologies in forming the link 915, a number of available ones of these technologies rely on an assumption that a device transmitting a piece of audio with multiple audio channels will transmit that audio to only one other device that will receive and use all of those channels. As a result, some of these technologies are not meant to separately transmit different audio channels of a piece of audio to different other devices that will receive the different audio channels and separately make use of the different audio channels. In order to accommodate such a limitation, the wireless audio devices 100*a* and 100*b* cooperate to present the personal electronic device 900 with the appearance of forming the link 915 with only a single other device (namely the wireless audio device 100*a*) to which the personal electronic device 900 transmits a piece of audio. Though both of the wireless audio devices 100*a* and 100*b* receive signals from the personal electronic device 900, only one of the wireless audio devices 100*a* and 100*b* transmits to the personal electronic device 900 (i.e., the wireless audio device 100*a*, as depicted).

While the personal electronic device 900 transmits the piece of audio across the link 915 to the wireless audio device 100*a*, the wireless audio device 100*b* also picks up the same signal and receives the same piece of audio despite not being the intended recipient. Where a packet of digitized audio is either not received or is received as corrupted by the wireless audio device 100*a*, the wireless audio device 100*a* transmits an error signal across the link 915 to the personal electronic device 900 to cause the packet to be retransmitted. Where a packet of digitized audio is either not received or is received as corrupted by the wireless audio device 100*b*, the wireless audio device 100*b* transmits an error signal across the link 115 to the wireless audio device 100*a* to be forwarded on to the personal electronic device 900 across the link 915 to cause the packet to be retransmitted.

The link 915 may also be used by the wireless audio device 100*a* to transmit remote control commands (perhaps generated as a result of a user operating the control 122) back to the personal electronic device 900. Given that the wireless audio device 100*b* only receives signals from the personal electronic device 900, and does not transmit to the personal electronic device 900, where the wireless audio device 100*b* is caused by a user to generate remote control commands, those commands are transmitted across the link 115 to be forwarded to the personal electronic device 900 across the link 915.

The technologies on which the links 115 and 915 are based dictate what is entailed in forming those links, and those links may be of any of a wide variety of types employing RF signals, infrared signals, or any of a variety of other forms of wireless transmission media. It is preferred for the sake of efficiency, though not necessary, that both of the links 115 and 915 be based on technologies that are at least similar enough to avoid having to incorporate two completely separate transceivers into either of the wireless audio devices 100*a* and 100*b*, since both must receive the same signal conveying audio from the personal electronic device 900. Where RF signals are employed, these links may at least partially conform to the Bluetooth specification, or to any of a variety of other specifications for wireless networking as would be appropriate in shortness of range and limited power consumption for portable devices that may be carried by a user on his or her person. As those familiar with such wireless specifications will readily recognize, such wireless communications are often accompanied with security mechanisms that include requiring two devices that are to be in such communication with each other to first undergo a link establishment procedure between them by which identification codes, security keys, etc., are exchanged between them. Depending on the technology on which each of the links 115 and 915 is based, one or both of the wireless audio devices 100*a* and 100*b* may engage in such link establishment procedures.

Depending on the technology employed in the link 915, the wireless audio device 100*a* may be required to provide information to the personal electronic device 900 about its own functionality. The wireless audio device 100*a* addresses this requirement by providing a false indication across the link 915 to the personal electronic device 900 that the wireless audio device 100*a* is, itself, capable of receiving and audibly outputting audio having multiple audio channels. The wireless audio device 100*a* does this, instead of more truthfully indicating that it can audibly output only a single audio channel, in order to induce the personal electronic device 900 into transmitting multiple audio channels of a piece of audio to the wireless audio device 100*a* across the link 915. This is allow the wireless audio device 100*b* the opportunity to also pickup the transmission of the multiple channels of audio transmitted by the personal electronic device 900 to the wireless audio device 100*a*. During the transmission of this audio by the personal electronic device 900 including multiple channels, both of the wireless audio devices 100*a* and 100*b* receive all of the multiple channels, but each of the wireless audio devices 100*a* and 100*b* make use of only the one or more audio channels that are of use to each. In other words, the wireless audio device 100*b* to is able to "listen in" and make use of the transmissions of audio directed by the personal electronic device 900 to the wireless audio device 100*a*, and make use of whatever channels of audio it needs.

More specifically, where the link 915 at least partially conforms to the Bluetooth specification, the wireless audio device 100*a* falsely indicates having support for one or more Bluetooth "profiles" (more commonly referred to as protocols in other forms of wireless technology) to induce the personal electronic device 900 to transmit multiple channels of a given piece of audio across the link 915. Further, where either of the wireless audio devices 100*a* and 100*b* incorporate either the control 122 or some form of indicator (not shown), the wireless audio device 100*a* may also indicate having support for profiles (protocols) allowing for either remote control commands to be transmitted back to the personal electronic device 900 or non-audio data (such as text data) to be transmitted by the personal electronic device 900. Among the Bluetooth profiles that the wireless audio device 100*a* may falsely indicate having support for may be the general audio/video distribution profile (GAVDP), the advanced audio distribution profile (A2DP), the human interface device protocol (HIDP), the audio/video remote control profile (AVRCP), and the serial port profile (SPP).

The link 115 may or may not require similar link establishment procedures to be formed. This will depend on the degree to which the wireless audio devices 100*a* and 100*b* may be received by a user as already configured to locate each other and interact with each other, and/or the degree to which each has been configured to employ a simplified link establishment procedure.

With the links 115 and 915 established and needed exchanges of information to enable required protocols already completed, the links 115 and 915 are able to be used in the transfer of audio from the personal electronic device 900 to both of the wireless audio devices 100a and 100b. As already discussed, the personal electronic device 900 transmits audio across the link 915 to the wireless audio device 100a, but the wireless audio device 100b also receives the same signal, and each of the wireless audio devices 100a and 100b extract the audio channels of use to each in audibly outputting audio to a user. The link 115 is used to coordinate various aspects of this activity between the wireless audio devices 100a and 100b, including and not limited to, synchronizing timings, exchanging volume and various audio signal processing settings, and sharing data to implement noise cancellation functions. The link 115 may be employed for network management functions, most especially for the management of the link 915, including passing identity codes to the wireless audio device 100b to enable the wireless audio device 100b to "listen in" on transmissions across the link 915, and passing decryption keys to the wireless audio device 100b to enable the wireless audio device 100b to decrypt audio transmitted across the link 915. By way of example, whichever one of the wireless audio devices 100a and 100b incorporates a manually-operable control (e.g., the control 122) that is employed as a volume control may transmit user volume settings to the other of these two devices.

Where the wireless audio device 100a incorporates the depicted control 122, and the control 122 is configured to send remote control commands to the personal electronic device 900 when manually operated, the link 915 is employed to convey those remote control commands from the wireless audio device 100a to the personal electronic device 900. Where the wireless audio device 100b incorporates a manually-operated control (not shown), and that control is configured to send remote control commands to the personal electronic device 900 when manually operated, the link 115 is employed to convey those remote control commands from the wireless audio device 100b to the wireless audio device 100a, which forwards those commands onward to the personal electronic device 900 via the link 915.

Where the wireless audio device 100a incorporates an indicator (not shown) enabling non-audio data to be displayed to a user, and that indicator is configured to be used to display-data received from the personal electronic device 900, that data is conveyed to the wireless audio device 100a via the link 915. Where the wireless audio device 100b incorporates an indicator (also not shown) enabling non-audio data to be displayed to a user, and that indicator is configured to be used to display data received from the personal electronic device 900, that data is conveyed to the wireless audio device 100a via the link 915. However, just as in the case of audio data, the non-audio data is also received by the wireless audio device 100b by "listening in" on information transferred by the personal electronic device 900 across the link 915.

Figure 2:
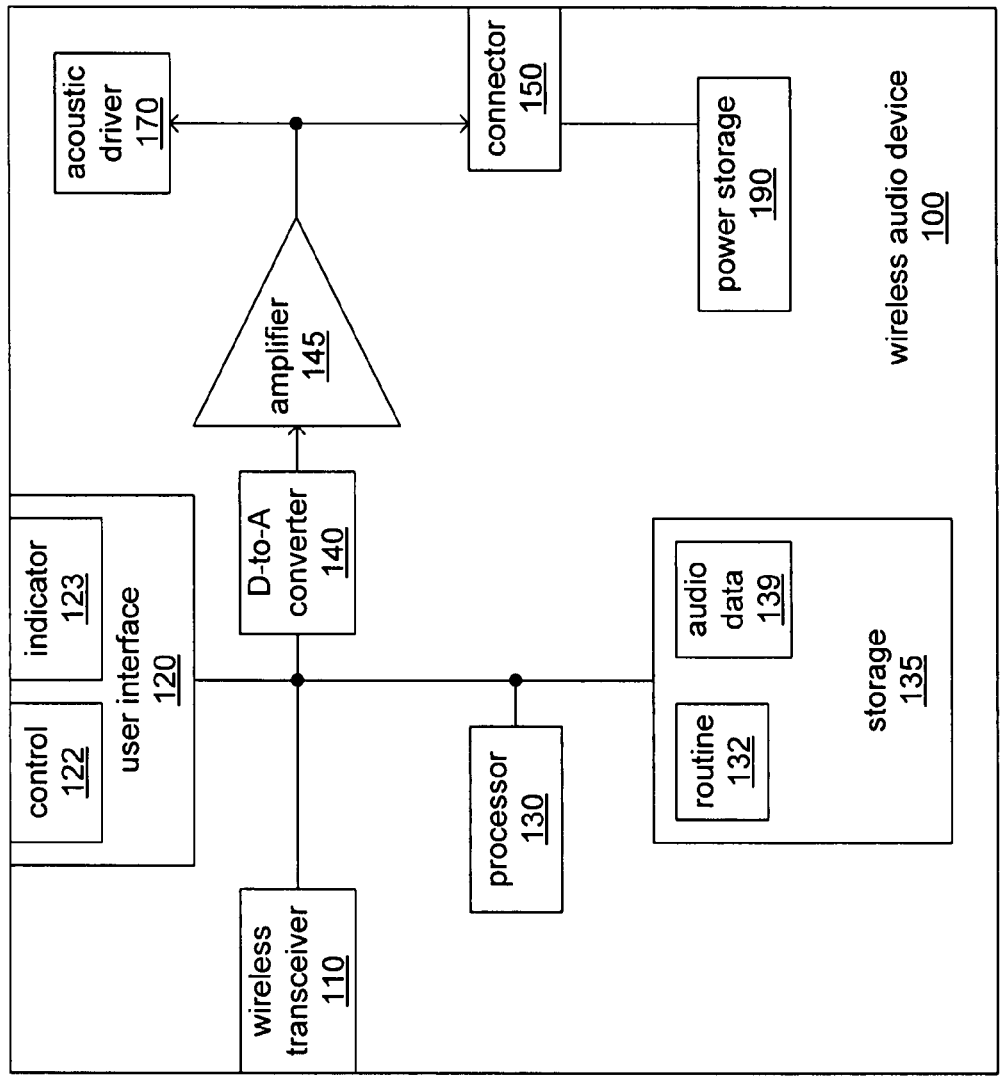
FIG. 2 is a block diagram of a wireless audio device of FIG. 1.

FIG. 2 is a block diagram of one possible internal architecture of either or both of the wireless audio devices 100a and 100b of FIG. 1. Although the wireless audio devices 100a and 100b may incorporate differing architectures, it is preferred that the wireless audio devices 100a and 100b of FIG. 1 be of the same architecture, such that their roles as described with regard to FIG. 1 could be reversed. This would be advantageous to achieve greater manufacturing efficiencies and to allow one replacement part to be required to resolve device failures, rather than two different parts.

The wireless audio device 100 incorporates a wireless transceiver 110, a user interface 120, a processor 130, a storage 135, a digital-to-analog (D-to-A) converter 140, an amplifier 145, a connector 150, an acoustic driver 170 and a power storage 190 storing and providing electrical power to the rest of these. As those skilled in the art of processor-based systems will readily recognize, a wide variety of bus architectures linking various ones of these may be employed, however, regardless of the exact architecture employed, the processor 130 is provided access to at least the wireless transceiver 110, the user interface 120, the storage 135 and the D-to-A converter 140. As will be explained in greater detail, the processor 130 accesses the storage 135 to retrieve a sequence of instructions making up a routine 132, and in executing the routine 132, the processor 130 is caused to perform various functions during the operation of the wireless audio device 100.

The processor 130 may be any of a variety of types of processing device, including but not limited to, a general purpose processor, a digital signal processor or other more specialized processor having a limited instruction set optimized for a given range of functions, a microcontroller or combinational logic. The storage 135 may be based on any of a wide variety of information storage technologies, including but not limited to, static RAM, dynamic RAM, ROM of either erasable or non-erasable form, FLASH, magnetic memory, ferromagnetic disk storage, phase-change storage or magneto-optical storage. The storage 135 stores at least the routine 132, and depending on what audio processing and/or audio buffering functions are caused by the routine 132 to be performed by the processor 130, the storage 135 may also store an audio data 139.

The technology on which the wireless transceiver 110 is based depends on the technology of whatever wireless point-to-point links the wireless audio device 100 forms with other devices. At a minimum, execution of the routine 132 causes the processor 130 to operate the wireless transceiver 110 to receive audio from a personal electronic device, perhaps along with non-audio data. In various embodiments, and depending on the role occupied by a given one of the wireless audio device 100, the processor 130 may be further caused by the routine 132 to operate the wireless transceiver 110 to convey commands across a wireless point-to-point link, either to a personal electronic device or to another wireless audio device to be forwarded on to a personal electronic device. Where a wireless point-to-point link between the wireless audio device 100 and another device at least partly conforms to the Bluetooth specification or a similar specification for point-to-point wireless communication, the processor 130 may be caused by the routine 132 to operate the wireless transceiver 110 to carry out a link establishment procedure to establish that point-to-point link. The processor 130 may be further caused, either during the link establishment procedure or during a subsequent link initialization procedure, to operate the wireless transceiver 110 to exchange information concerning functional capabilities between the wireless audio device 100 and another device. Where the given role of the wireless audio device 100 is to engage a personal electronic device in two-way communications (as was the case with the wireless audio device 100a in FIG. 1), and where the exchange of information is with that personal electronic device, then as previously discussed, the wireless audio device transmits false information about its own function capabilities to induce the wireless device to enable the use of various protocols and/or data formats to be used in communicating audio having multiple audio channels.

The user interface 120 incorporates one or both of the previously-discussed control 122 and indicator 123. The control 122 may be any type of manually-operable control, including but not limited to, a button, a lever switch, a rotatable knob, a touch-screen sensor, a pressure sensor, a proximity sensor or an orientation sensor. The indicator 123 may be any of a number of possible devices conveying information to a user of the wireless audio device 100, including but not limited to, a graphical display capable of depicting various symbols and/or language characters, one or more LEDs, a buzzer, or a vibration-generating device. Alternatively, information may be provided to a user of the wireless audio device 100 through the output of audio conveying that information which is mixed with the audio received by the wireless transceiver 110, with the mixed audio being output to the user. Where the control 122 is provided, the control 122 may be employed by a user of the wireless audio device 100 for one or more of initiating the performance of some form of link establishment procedure, controlling one or more aspects of the provision of audio to a user (e.g., the volume employed in outputting audio to the user), and remotely controlling another wireless device with which a point-to-point link is formed. Where the indicator 123 is provided, the indicator 123 may be employed to display information received by the wireless transceiver 110 from another wireless device and/or information generated by the wireless audio device 100, itself.

The D-to-A converter 140 and the amplifier 145 may each be of any of a wide variety of designs and forms. The D-to-A converter 140 may be accessible by the processor 130, not only to enable the processor 130 to supply the D-to-A converter 140 with audio data, but also to enable the processor 130 to operate the D-to-A converter to support differing timings, bit formats, etc., of the audio data received from another wireless device through the wireless transceiver 110. The amplifier 145 may be accessible by the processor 130 to enable the processor to control aspects of the amplification of the analog form of audio provided by the D-to-A converter 140, including the gain used in amplification, perhaps as a form of volume control.

The connector 150, at a minimum, enables an external power source to be connected to the wireless audio device 100, and may enable that external power source to recharge the power storage 190. In various embodiments, the connector 150 may also enable amplified audio from the audio amplifier 145 to be provided to an external acoustic driver, where either the wireless audio device 100 does not incorporate the acoustic driver 170, or a user desires to use an external acoustic driver in place of or in addition to the acoustic driver 170. Also, although a conventional implementation of the connector 150 may tend to incorporate multiple electrically-conductive contacts for conveying at least power and perhaps also commands and other data, those skilled in the art will readily recognize that the connector 150 may incorporate non-electrically-conductive approaches to conveying power, audio, commands and/or other data. By way of example, electromagnetic induction may be employed to convey power, where the connector 150 simply provides a physical guide by which an external power source is brought close enough to the connector 150 to put coils within close enough proximity to enable induction to occur. By way of another example, the connector 150 may incorporate one or more fiber optic components to enable audio, commands and/or other data to be conveyed using light, instead of electricity.

As previously discussed, depending on the nature of a point-to-point link between the wireless audio device 100 and another device, a link establishment procedure may be required to form the point-to-point link. In some embodiments, a user of both the wireless audio device 100 and another device (such as a personal electronic device or another wireless audio device) would operate both devices to initiate a link establishment procedure between them. For the wireless audio 100, this may entail the processor 130 being caused by the routine 132 to monitor the control 122 for an instance of the control 122 being operated by the user to initiate the link establishment procedure, and then operating the transceiver 110 to carry out the link establishment procedure.

Following at least the establishment of the wireless point-to-point link, the processor 130 may be further caused by the routine 132 to provide information concerning functionality to the other device with which the link is formed. Whether such provision of information is necessary and the nature of that information depends on the technologies employed in the wireless point-to-point link. It is likely that during the course of forming and/or initializing the wireless link, such information will have to be provided to the other device, especially if the wireless link is based on a wireless networking standard such as the Bluetooth specification. As already discussed, where the other device with which the wireless audio device 100 has formed a given link is a personal electronic device from which audio having multiple audio channels is to be received, then the processor 130 may be caused by the routine 132 to operate the transceiver 110 to provide the other device with a false indication that the wireless audio device 100 is capable of both receiving and audibly outputting multiple audio channels of a piece of audio having multiple audio channels, despite this not being true.

By way of example, where this link conforms to the Bluetooth specification, this may be done by the processor operating the transceiver 110 to transmit an indication across the link that the wireless audio device 100 is capable of all of the functionality associated with the Bluetooth A2DP profile to induce the other device to transmit audio with at least left and right audio channels. In this way, the wireless audio device 100 and another cooperating wireless audio device each receive audio from a personal electronic device with at least a stereo pairing of audio channels, with each of the wireless audio device 100 and the cooperating wireless audio device using a different one of the left and right audio channels to separately audibly output left and right audio channels to a user.

With the point-to-point link established and initialized, the processor 130, in executing the routine 132, is caused by the routine 132 to operate the wireless transceiver 110 to receive audio and to separate the desired one or more audio channels from the audio. Depending on the number and configuration of audio channels in the received audio, and depending on the number and configuration of wireless audio devices receiving the transmissions of audio emanating from a given personal electronic device, the processor 130 may also be caused to perform some degree of signal processing to derive the audio to be audibly output by the wireless audio device 100. Then, the processor 130 is further caused to transfer audio to the D-to-A converter 140 where that audio is converted to analog form before being provided to the audio amplifier 145 to create amplified audio. Depending on whether or not the wireless audio device 100 incorporates the acoustic driver 170 and depending on whether or not the audio amplifier 145 is connected to the connector 150, the amplified audio output by the audio amplifier 145 is caused to be audibly output to a user by being presented to one or both of the acoustic driver 170 and the connector 150 to which an external acoustic driver may be connected.

The processor 130 may be further caused to buffer the received audio as the audio data 139 stored within the storage 135 for various reasons. It may simply be deemed desirable to buffer the received audio as part of handling possible instances of interruptions in the point-to-point link so as to avoid a break in the output to the user through the wired device. It may be necessary to buffer the received audio to allow the processor 130 to perform various forms of signal processing on the received audio. Such signal processing may be part of implementing a volume control function in the digital domain. Such signal processing may further be part of converting received audio from having one quantity of audio channels of a given configuration to having a different quantity of audio channels of a different configuration. Further, it may be necessary to buffer the received audio to enable the processor 130 to decompress it under the control of the routine 132 before the audio is audibly output.

Where a wireless device supports it, the establishment and initialization of a point-to-point link also enables the transfer of commands across that point-to-point link. Commands to remotely control the wireless audio device 100 may emanate from either a personal electronic device that also transmits audio or another wireless audio device. Similarly, commands emanating from the wireless audio device may control one or both of a personal electronic device and another wireless audio device. Other forms of data may similarly emanate from a personal electronic device and/or another wireless audio device. By way of example, where the wireless audio device 100 incorporates the control 122, the processor 130 may be caused by the routine 137 to monitor the control 122 for instances of a user operating the control 122 to remotely control an aspect of the operation of a personal electronic device, such as remote control commands to play, fast-forward or pause an audio recording that the wireless device is playing. In response to the user so operating the control 122, the processor 130 may be further caused to operate the wireless transceiver 110 to transmit a corresponding command to the wireless device. Similarly, the processor 130 may take similar action in response to the user operating the control 122 to remotely control and aspect of another wireless device, such as a volume setting, muting, treble/bass adjustments, etc. By way of another example, where the audio interposer device 100 incorporates the indicator 123, the processor 130 may be caused by the routine 137 to respond to the receipt of a piece of data from a personal electronic device by operating the indicator 123 to provide an indication corresponding to that data, such as textual information concerning the origins of a piece of audio transmitted by the personal electronic device where the indicator 123 is capable of displaying textual information. Similarly, the processor 130 may take similar action in response to receiving a piece of data from another wireless audio device.

As previously discussed, more than one wireless audio device must cooperate to receive and use multiple audio channels of audio that a personal audio device transmits to one of those wireless audio devices. As previously discussed, such coordination is enabled through the formation of additional wireless point-to-point links formed between the wireless audio devices (e.g., the link 115 between the wireless audio devices 100*a* and 100*b* in FIG. 1). Across that link, a wireless audio device having a link with a personal electronic device can transmit network management information such as authentication, identification and/or decryption information needed for other wireless audio devices to receive and use the transmissions of multi-channel audio (as well as other data) from the personal electronic device. Across that link, wireless devices are also able to synchronize audio timings so that different channels are audibly output by different wireless audio devices to a user in a manner that is synchronized. Across that link, remote control, indications of errors from packets of audio not received or received with corrupted audio data, and non-audio data may be exchanged between wireless audio devices and/or conveyed through a wireless audio device having a link with the personal electronic device.

The processor 130 is caused by the routine 132 to either generate or receive a synchronization signal, and to use that synchronization signal as needed to synchronize its own audible audio output with that of other wireless audio devices. Further, the processor 130 is caused to operate the transceiver 110 to pass on commands, non-audio data and/or error indications as needed between other devices where needed, and to buffer those commands, non-audio data and/or error indications where needed in the storage 135.

As previously noted, it is preferred that the wireless audio devices 100*a* and 100*b* of FIG. 2 be of substantially the same design, whether that design incorporates the architecture of the wireless audio device 100 of FIG. 2, or not. Where substantially similar designs are used, then any one of multiple wireless audio devices employed by a user with a personal electronic device may be given the role of having a wireless point-to-point link with the personal electronic device to induce it to transmit multiple-channel audio.

Figure 3:
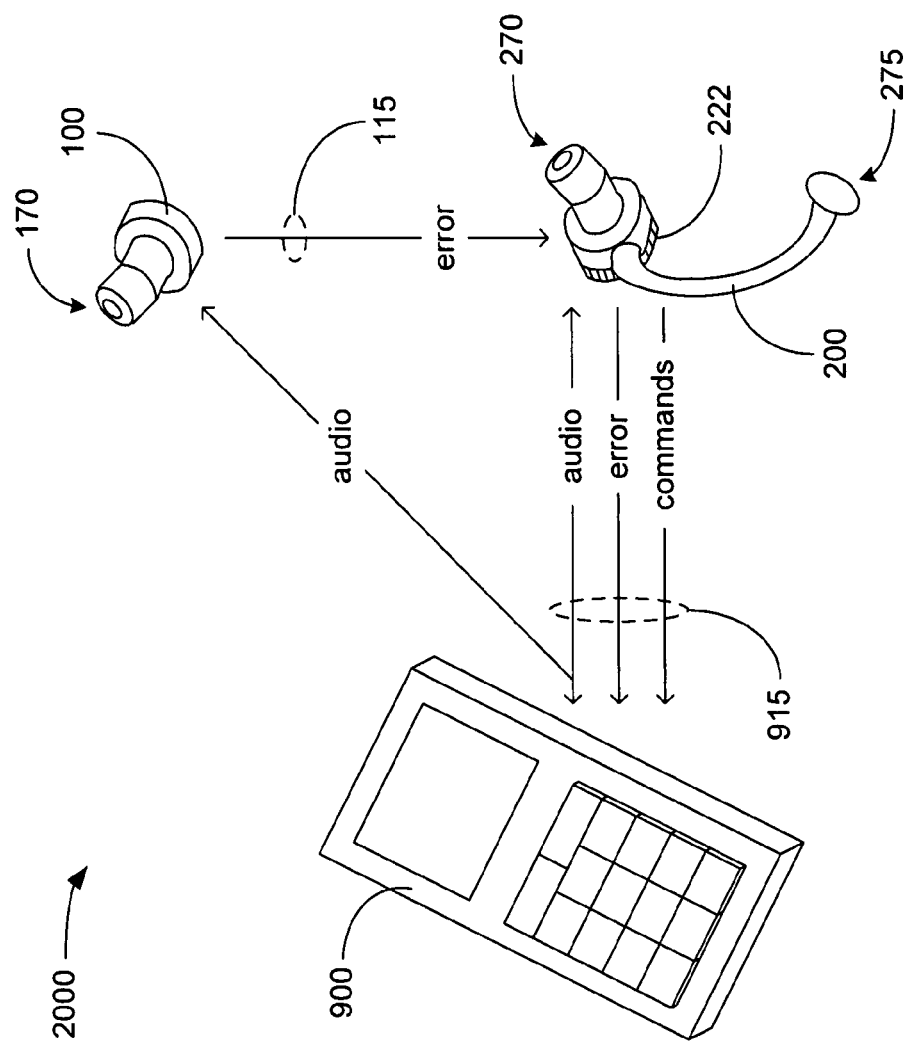
FIG. 3 is another block diagram of a wireless network incorporating multiple wireless audio devices and a personal electronic device.

FIG. 3 depicts a network 2000 in which audio is transferred among three personal electronics devices, specifically, a personal electronic device 900 and a pair of wireless audio devices 100 and 200. The network 2000 is substantially similar to the network 1000 of FIG. 1, being a pseudo hub-and-spoke topology in which the personal electronic device 900 is presented with false indications of being in wireless communications to transfer audio solely to a single wireless audio device (the wireless audio device 200, as depicted) across a single wireless point-to-point link 915, but with the purpose of inducing the personal electronic device 900 to also transfer the audio to at least one other wireless audio device (the wireless audio device 100, as depicted). Indeed, where possible, many of the same numeric labels have been used between the FIGS. 1 and 3 depictions of the networks 1000 and 2000, respectively, where there are substantial similarities. Also, the wireless audio device 100 is substantially similar to the wireless audio devices 100*a* and 100*b* of FIG. 1, being a wireless audio device that receives and audibly outputs audio, and may also be capable of exchanging remote control commands and/or non-audio data. The most substantial difference between the networks 1000 and 2000 is that the wireless audio device 100*a* of the network 1000 has been replaced with the wireless audio device 200, which unlike the wireless audio devices 100, 100*a* and 100*b* of this and earlier figures, is capable of wireless transmitting other audio detected with a microphone across a wireless point-to-point link.

In occupying the same role as the wireless audio device 100*a* of FIG. 1, the wireless audio device 200 forms the link 915 with the personal electronic device 900. However, given the ability of the wireless audio device 200 to transmit other audio detected with a microphone, the wireless audio device 200 is able to engage in a two-way exchange of audio with the personal electronic device 900 directly through the link 915. It should be noted that in other embodiments, the roles of the wireless audio devices 100 and 200 could be switched such that the wireless audio device 100 has the direct two-way communication through the link 915 with the personal electronic device 200. However, this would require that the other audio from a microphone transmitted by the wireless audio device 200 be relayed through the wireless audio device 100, thereby adding a timing delay in the receipt of that other audio by the personal electronic device 900, and requiring the wireless audio device 100 to consume what may be a limited reserve of electric power at a faster rate to carry out such relaying.

Not unlike the wireless audio devices 100, 100a and 100b of this and earlier figures, the wireless audio device 200 is meant to wirelessly receive audio and enable output of that audio in audible form. Although the wireless audio device 200 is depicted as being a wireless earpiece (sometimes also referred to as a wireless headset), this is intended to be illustrative of one form of device, and the wireless audio device 200 could be of any of a number of types of devices capable of audibly outputting wirelessly-received audio and wirelessly transmitting detected audio (e.g., a wireless speakerphone). The wireless audio device 200 incorporates at least one acoustic driver 170 (e.g., an electromagnetic speaker, a piezo-electric electric element, an electrostatic speaker, etc.), a microphone 275 (or in other embodiments, may support the connection of an external microphone) and a manually-operable control 222. The wireless audio device 200 may further incorporate an indicator (not shown). Where the wireless audio device 200 incorporates the control 222, the control 222 may be operable to enable a user to remotely control the personal electronic device 900 and/or the wireless audio device 100. Where the wireless audio device 200 incorporates an indicator, the indicator may enable non-audio data to be displayed to a user.

As previously discussed, a number of the available technologies on which the link 915 may be based rely on an assumption that a device transmitting a piece of audio with multiple audio channels will transmit that audio to only one other device that will receive and use all of those channels. In order to accommodate such a limitation, the wireless audio devices 100 and 200 cooperate to present the personal electronic device 900 with the appearance of forming the link 915 with only a single other device (namely the wireless audio device 200) to which the personal electronic device 900 transmits a piece of audio. Though both of the wireless audio devices 100 and 200 receive signals from the personal electronic device 900, only one of the wireless audio devices transmits to the personal electronic device 900 (i.e., the wireless audio device 200, as depicted).

While the personal electronic device 900 transmits the piece of audio across the link 915 to the wireless audio device 200, the wireless audio device 100 also picks up the same signal and receives the same piece of audio despite not being the intended recipient. The link 115 may be employed by the wireless audio device 200 to provide various pieces of network management information to the wireless audio device 100 to enable the wireless audio device 100 to pick up and identify the signal by which the piece of audio is transmitted. Where a packet of digitized audio is either not received or is received as corrupted by the wireless audio device 200, the wireless audio device 200 transmits an error signal across the link 915 to the personal electronic device 900 to cause the packet to be retransmitted. Where a packet of digitized audio is either not received or is received as corrupted by the wireless audio device 100, the wireless audio device 100 transmits an error signal across the link 115 to the wireless audio device 200 to be forwarded on to the personal electronic device 900 across the link 915 to cause the packet to be retransmitted.

The link 915 is also used by the wireless audio device 200 to transmit audio detected with the microphone 275 (or an externally connected microphone) to the personal electronic device 900. The link 915 may also be used by the wireless audio device 200 to transmit remote control commands back to the personal electronic device 900. Given that the wireless audio device 100 only receives signals from the personal electronic device 900, and does not transmit to the personal electronic device 900, where the wireless audio device 100 is caused by a user to generate remote control commands, those commands are transmitted across the link 115 to be forwarded to the personal electronic device 900 across the link 915.

Depending on the technology employed in the link 915, the wireless audio device 100a may be required to provide information to the personal electronic device 900 about its own functionality. Not unlike the wireless audio device 100a of FIG. 1, the wireless audio device 200 addresses this requirement by providing a false indication across the link 915 to the personal electronic device 900 that the wireless audio device 200 is, itself, capable of receiving and audibly outputting audio having multiple audio channels. This induces the personal electronic device 900 into transmitting multiple audio channels of a piece of audio to the wireless audio device 200 across the link 915, thereby allowing the wireless audio device 100 the opportunity to also pickup the transmission of the multiple channels of audio transmitted by the personal electronic device 900 to the wireless audio device 200. During the transmission of this audio by the personal electronic device 900 including multiple channels, both of the wireless audio devices 100 and 200 receive all of the multiple channels, but each of the wireless audio devices 100 and 200 make use of only the one or more audio channels that are of use to each.

More specifically, where the link 915 at least partially conforms to the Bluetooth specification, the wireless audio device 200 the audio interposer device 200 may falsely indicate having support for one or more of the Bluetooth "profiles" mentioned earlier with regard to the wireless audio device 100a of FIG. 1. Alternatively and/or additionally, the two-way audio exchange capabilities of the wireless audio device 200 allows false indications for a greater number of Bluetooth profiles, and so some of the other Bluetooth profiles that the wireless audio device 200 may falsely indicate having support for may be the headset profile (HSP), the hands-free profile (HFP), the intercom profile (ICP) and the cordless telephony profile (CTP).

The link 115 may or may not require similar link establishment procedures to be formed. This will depend on the degree to which the wireless audio devices 100 and 100 may be received by a user as already configured to locate each other and interact with each other, and/or the degree to which each has been configured to employ a simplified link establishment procedure.

With the links 115 and 915 established and needed exchanges of information to enable required protocols already completed, the links 115 and 915 are able to be used in the transfer of audio from the personal electronic device 900 to both of the wireless audio devices 100 and 200. The link 115 is used to coordinate various aspects of this activity between the wireless audio devices 100 and 200, including and not limited to, synchronizing timings, exchanging volume and various audio signal processing settings, sharing data to implement noise cancellation functions, conveying authentication or identification information, and conveying decryption keys. By way of example, whichever one of the wireless audio devices 100 and 200 incorporates a manually-operable control (e.g., the control 222) that is employed as a volume control may transmit user volume settings to the other of these two devices.

Additionally, the link 915 is able to be used in the transfer of audio detected with a microphone from the wireless audio device 200 to the personal electronic device 900. If the roles of the wireless audio devices 100 and 200 are reversed such that it is the wireless audio device 100 in direct communication with the personal electronic device 900 through the link 915, then the link 115 would be further used to convey the detected audio from the wireless audio device 200 to the wireless audio device 100 to be relayed to the personal electronic device 900.

Where the wireless audio device 200 incorporates the depicted control 222, and the control 222 is configured to send remote control commands to the personal electronic device 900 when manually operated, the link 915 is employed to convey those remote control commands from the wireless audio device 200 to the personal electronic device 900. Where the wireless audio device 100 incorporates a manually-operated control (not shown), and that control is configured to send remote control commands to the personal electronic device 900 when manually operated, the link 115 is employed to convey those remote control commands from the wireless audio device 100 to the wireless audio device 200, which forwards those commands onward to the personal electronic device 900 via the link 915.

Where the wireless audio device 200 incorporates an indicator (not shown) enabling non-audio data to be displayed to a user, and that indicator is configured to be used to display data received from the personal electronic device 900, that data is conveyed to the wireless audio device 200 via the link 915. Where the wireless audio device 100 incorporates an indicator (also not shown) enabling non-audio data to be displayed to a user, and that indicator is configured to be used to display data received from the personal electronic device 900, that data is conveyed to the wireless audio device 200 via the link 915. However, just as in the case of audio data, the non-audio data is also received by the wireless audio device 100 by "listening in" on information transferred by the personal electronic device 900 across the link 915.

Figure 4:
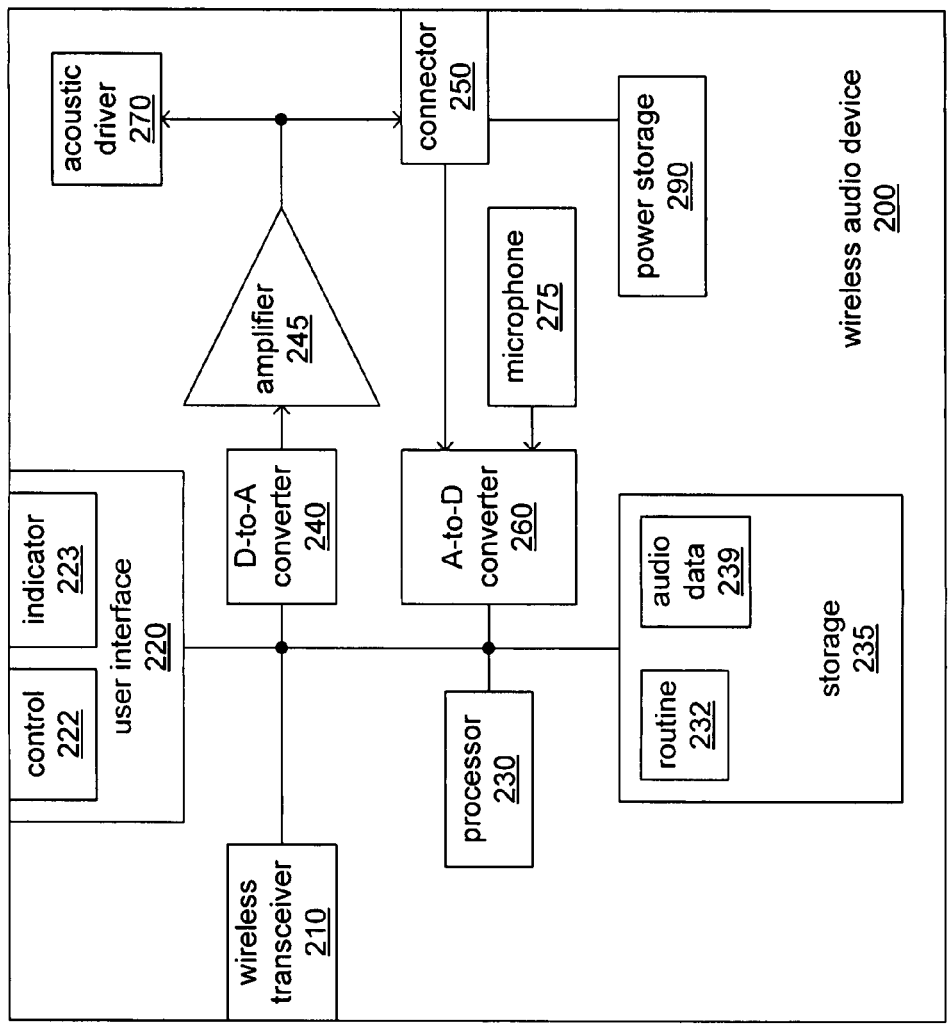
FIG. 4 is a block diagram of a wireless audio device of FIG. 3.

FIG. 4 is a block diagram of one possible internal architecture of the wireless audio device 200 of FIG. 3. The wireless audio device 200 incorporates a wireless transceiver 210, a user interface 220, a processor 230, a storage 235, a digital-to-analog (D-to-A) converter 240, an amplifier 245, a connector 250, an analog-to-digital (A-to-D) converter 260, perhaps an acoustic driver 270, perhaps a microphone 275 and a power storage 290 storing and providing electrical power to the rest of these. The architecture of the wireless audio device 200 depicted in FIG. 4 is substantially similar to the architecture of the wireless audio device 100 depicted in FIG. 2 with the substantial difference being the addition of a few components to support wirelessly transmitting audio detected with a microphone to one or more other devices. Indeed, where substantially similar components performing substantially similar functions exist, they have been designated with labels in which the last two digits are identical to ease between them. Regardless of the exact architecture employed, the processor 230 is provided access to at least the wireless transceiver 210, the user interface 220, the storage 235, the D-to-A converter 240 and the A-to-D converter 260. As will be explained in greater detail, the processor 230 accesses the storage 235 to retrieve a sequence of instructions making up a routine 232, and in executing the routine 232, the processor 230 is caused to perform various functions during the operation of the wireless audio device 200.

The processor 230 may be any of a variety of types of processing device, and the storage 235 may be based on any of a wide variety of information storage technologies. The storage 235 stores at least the routine 232, and depending on what audio processing and/or audio buffering functions are caused by the routine 232 to be performed by the processor 230, the storage 235 may also store an audio data 239.

The technology on which the wireless transceiver 210 is based depends on the technology of whatever wireless point-to-point links the wireless audio device 200 forms with other devices. At a minimum, execution of the routine 232 causes the processor 230 to operate the wireless transceiver 210 to receive audio from a personal electronic device (either directly or relayed), perhaps along with commands and/or non-audio data. Also at a minimum, the execution of the routine 232 causes the processor 230 to operate the wireless transceiver 210 to send audio detected with a microphone back to the same personal electronic device (either directly or relayed), perhaps along with commands and/or non-audio data. Where a wireless point-to-point link between the wireless audio device 200 and another device at least partly conforms to the Bluetooth specification or a similar specification for point-to-point wireless communication, the processor 230 may be caused by the routine 232 to operate the wireless transceiver 210 to carry out a link establishment procedure to establish that point-to-point link. The processor 230 may be further caused, either during the link establishment procedure or during a subsequent link initialization procedure, to operate the wireless transceiver 210 to exchange information concerning functional capabilities between the wireless audio device 200 and another device. Where the given role of the wireless audio device 200 is to engage a personal electronic device in direct two-way communications (as was the case with the wireless audio device 200 in FIG. 3), then as previously discussed, the wireless audio device transmits false information about its own function capabilities to induce the wireless device to enable the use of various protocols and/or data formats to be used in communicating audio having multiple audio channels.

The user interface 220 incorporates one or both of the previously-discussed control 222 and indicator 223. The control 222 may be any type of manually-operable control and the indicator 223 may be any of a number of possible devices conveying information to a user of the wireless audio device 200. Alternatively, information may be provided to a user of the wireless audio device 100 through the output of audio conveying that information which is mixed with mixed audio being output to the user. Where the control 222 is provided, the control 222 may be employed by a user of the wireless audio device 200 for one or more of initiating the performance of some form of link establishment procedure, controlling one or more aspects of the provision of audio to a user (e.g., the volume employed in outputting audio to the user), and remotely controlling another wireless device with which a point-to-point link is formed. Where the indicator 223 is provided, the indicator 223 may be employed to display information received by the wireless transceiver 210 from another wireless device and/or information generated by the wireless audio device 200, itself.

The D-to-A converter 240, the amplifier 245 and the A-to-D converter 260 may each be of any of a wide variety of designs and forms. The D-to-A converter 240 and/or the A-to-D converter 260 may be accessible by the processor 230 to enable the processor 230 to operate either to support differing timings, audio bit formats, etc. The amplifier 245 may be accessible by the processor 230 to enable the processor to control aspects of amplification including the gain as perhaps a form of volume control.

The connector 250, at a minimum, enables an external power source to be connected to the wireless audio device 200, and may enable that external power source to recharge the power storage 290. In various embodiments, the connector 250 may also enable amplified audio from the audio amplifier 245 to be provided to an external acoustic driver, where either the wireless audio device 200 does not incorporate the acoustic driver 270, or a user desires to use an external acoustic driver in place of or in addition to the acoustic driver 270. In various embodiments, the connector 250 may also enable audio detected by an external microphone to be provided to the A-to-D converter 260 where either the wireless device 200 does not incorporate the microphone 275, or a user desires to use an external microphone in place of or in addition to the microphone 275. Also, as an alternative to or in addition to using multiple electrically-conductive contacts for conveying at least power and perhaps also commands and other data, the connector 250 may incorporate non-electrically-conductive approaches to conveying power, audio, commands and/or other data.

As previously discussed, depending on the nature of a point-to-point link between the wireless audio device 200 and another device, a link establishment procedure may be required to form the point-to-point link. In some embodiments, a user of both the wireless audio device 200 and another device (such as a personal electronic device or another wireless audio device) would operate both devices to initiate a link establishment procedure between them. For the wireless audio 200, this may entail the processor 230 being caused by the routine 232 to monitor the control 222 for an instance of the control 222 being operated by the user to initiate the link establishment procedure, and then operating the transceiver 210 to carry out the link establishment procedure.

Following at least the establishment of the wireless point-to-point link, the processor 230 may be further caused by the routine 232 to provide information concerning functionality to the other device with which the link is formed. As already discussed, where the other device with which the wireless audio device 200 has formed a given link is a personal electronic device from which audio having multiple audio channels is to be received, then the processor 230 may be caused by the routine 232 to operate the transceiver 210 to provide the other device with a false indication that the wireless audio device 200 is capable of both receiving and audibly outputting multiple audio channels of a piece of audio having multiple audio channels, despite this not being true.

With the point-to-point link established and initialized, the processor 230, in executing the routine 232, is caused by the routine 232 to operate the wireless transceiver 210 to transmit and receive audio. The processor 230 is caused to separate the desired one or more audio channels of the received audio from the rest of the received audio, and the processor 230 may also be caused to perform some degree of signal processing to derive the audio to be audibly output by the wireless audio device 200 from various ones of the audio channels of the received audio. Then, the processor 230 is further caused to transfer audio to the D-to-A converter 240 where that audio is converted to analog form before being provided to the audio amplifier 245 to create amplified audio that is driven to one or both of the acoustic driver 270 (if present) and an external acoustic driver connected to the connector 250. Audio detected by one or both of the microphone 275 (if present) and an external microphone connected to the connector 250 is provided to the A-to-D converter 260. Then, the processor 230 is further caused to transfer audio from the A-to-D converter 260 to the transceiver. The processor 230 may be further caused to buffer either or both the audio received through the transceiver 210 and the audio to be transmitted through the transceiver 210 as the audio data 239 stored within the storage 235 for various reasons in which signal processing, synchronization, or other operations must be performed on either received audio or audio to be transmitted.

Where the wireless audio device supports it, the establishment and initialization of the point-to-point link also enables the transfer of commands and/or non-audio data across that point-to-point link. Commands to remotely control the wireless audio device 200 may emanate from either a personal electronic device that also transmits audio or another wireless audio device. Similarly, commands emanating from the wireless audio device 200 may control one or both of a personal electronic device and another wireless audio device. Other forms of data may similarly emanate from a personal electronic device and/or another wireless audio device.

As previously discussed, more than one wireless audio device must cooperate to receive and use multiple audio channels of audio that a personal audio device transmits to one of those wireless audio devices. As previously discussed, such coordination is enabled through the formation of additional wireless point-to-point links formed between the wireless audio devices (e.g., the link 115 between the wireless audio devices 100 and 200 in FIG. 3). Across that link may be transmitted authentication, identification and/or decryption information needed for wireless audio devices to receive and use the transmissions of multi-channel audio and other data, as well as audio synchronization signals remote control commands, and indications of errors from packets of audio not received or received with corrupted audio data.

The processor 230 is caused by the routine 232 to either generate or receive a synchronization signal, and to use that synchronization signal as needed to synchronize its own audible audio output with that of other wireless audio devices. Further, the processor 230 is caused to operate the transceiver 210 to pass on commands, non-audio data and/or error indications as needed between other devices where needed, and to buffer those commands, non-audio data and/or error indications where needed in the storage 235.

Figure 5:
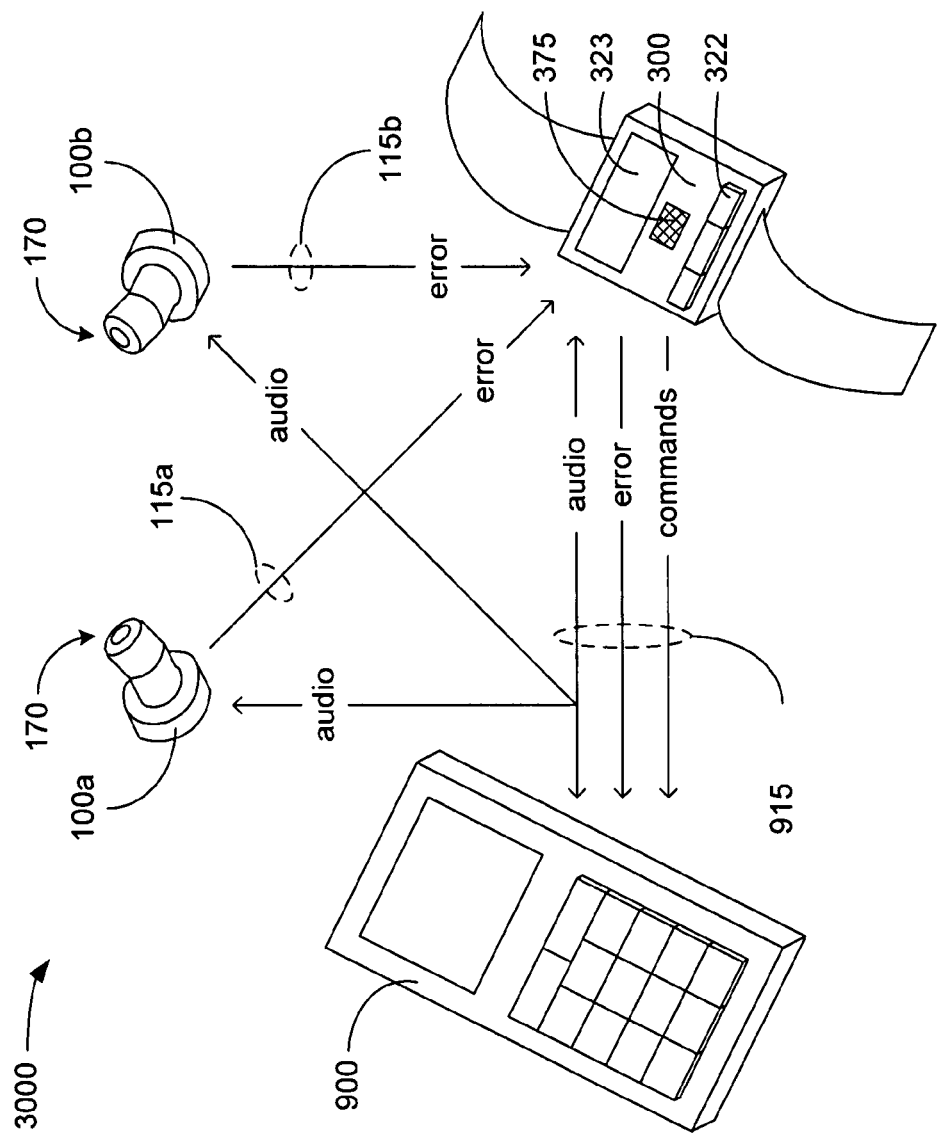
FIG. 5 is still another block diagram of a wireless network incorporating multiple wireless audio devices and a personal electronic device.

FIG. 5 depicts a network 3000 in which audio is transferred among four personal electronics devices, specifically, a personal electronic device 900 and a triplet of wireless audio devices 100a, 100b and 300. The network 3000 is substantially similar to the networks 1000 and 2000 of FIGS. 1 and 3, respectively, being a pseudo hub-and-spoke topology in which the personal electronic device 900 is presented with false indications of being in wireless communications to transfer audio solely with a single wireless audio device (the wireless audio device 300, as depicted) across a single wireless point-to-point link 915, but with the purpose of inducing the personal electronic device 900 to also transfer the audio to at least one other wireless audio device (the wireless audio devices 100a and 100b, as depicted). Indeed, where possible, many of the same numeric labels have been used between the FIGS. 1, 3 and 5 depictions of the networks 1000, 2000 and 3000, respectively, where there are substantial similarities. Also, the wireless audio device 300 is substantially similar to the wireless audio device 200 of FIG. 3, being a wireless audio device that transmits audio detected by a microphone, and may also be capable of exchanging remote control commands and/or non-audio data. The most substantial differences between the network 3000 from the networks 1000 and 2000 is that the personal electronic device 900 is now transmitting multiple-channel audio to three wireless audio devices, instead of two, and that in comparison to the network 2000, the audio detection and audible audio output functions of the wireless audio device 200 of the network 2000 have been split between two wireless audio devices in the network 3000.

The wireless audio device 300 occupies the same role as the wireless audio devices 100a and 200 of the networks 1000 and 2000, respectively, in forming the link 915 with the personal electronic device 900 and in providing a false indication of capabilities to the personal electronic device 900 to induce the personal electronic device 900 to transmit multiple-channel audio across the link 915. Like the wireless audio device 200 of the network 2000, the ability of the wireless audio device 300 to transmit other audio detected with a microphone enables the wireless audio device 300 to participate in a two-way exchange of audio with the personal electronic device 900. However, unlike the wireless audio device 200, the wireless audio device 300 is not capable of audibly outputting audio, and so that function must be performed by other wireless electronic devices (e.g., the wireless audio devices 100a and 100b, as depicted). It should be noted that in other embodiments, the roles of the wireless audio devices 100a, 100b and 300 could be switched such that one of the wireless audio devices 100a or 100b has the direct two-way communication through the link 915 with the personal electronic device 200. However, this would require that the audio from a microphone transmitted by the wireless audio device 300 be relayed through that wireless audio device, thereby adding a timing delay in the receipt of that other audio by the personal electronic device 900, and requiring that wireless audio device to consume what may be a limited reserve of electric power at a faster rate to carry out such relaying.

Not unlike the wireless audio device 200 of this and earlier figures, the wireless audio device 300 is meant to wirelessly transmit audio detected with a microphone. Although the wireless audio device 300 is depicted as being in a form meant to be strapped to possibly an arm or a wrist, this is intended to be illustrative of one form of device, and the wireless audio device 300 could be of any of a number of types of devices capable of transmitting detected audio (e.g., a wireless microphone). The wireless audio device 300 incorporates one or both of a microphone 375 (or in other embodiments, may support the connection of an external microphone) and a manually-operable control 322. The wireless audio device 300 may further incorporate an indicator (not shown). Where the wireless audio device 300 incorporates the control 322, the control 322 may be operable to enable a user to remotely control the personal electronic device 900 and/or one or both of the wireless audio devices 100a and 100b. Where the wireless audio device 300 incorporates an indicator, the indicator may enable non-audio data to be displayed to a user.

In a manner very much like what has been previously discussed, the wireless audio devices 100a, 100b and 300 cooperate to present the personal electronic device 900 with the appearance of forming the link 915 with only a single other device (namely the wireless audio device 300) to which the personal electronic device 900 transmits a piece of audio. Though all three of the wireless audio devices 100a, 100b and 300 receive signals from the personal electronic device 900, only one of the wireless audio devices transmits to the personal electronic device 900 (i.e., the wireless audio device 300, as depicted).

While the personal electronic device 900 transmits the piece of audio across the link 915 to the wireless audio device 300, the wireless audio devices 100a and 100b also picks up the same signal and receive the same piece of audio despite neither being the intended recipient. Despite receiving packets of audio from the personal electronic device 900, the wireless audio device 300 ignores them since it has no ability to drive an acoustic driver to audibly output audio. Where a packet of digitized audio is either not received or is received as corrupted by one or both of the wireless audio devices 100a and 100b, one or both transmits an error signal across corresponding links 115a and 115b to the wireless audio device 300 to be forwarded on to the personal electronic device 900 across the link 915 to cause the packet to be retransmitted.

The link 915 is also used by the wireless audio device 300 to transmit audio detected with the microphone 375 (or an externally connected microphone) to the personal electronic device 900. The link 915 may also be used by the wireless audio device 300 to transmit remote control commands back to the personal electronic device 900. Where either of the wireless audio devices 100a or 100b is caused by a user to generate remote control commands, those commands are transmitted across the links 115a and 115b, respectively to be forwarded to the personal electronic device 900 across the link 915.

Not unlike the wireless audio devices 100a and 200 of FIGS. 1 and 3, respectively, the wireless audio device 300 provides a false indication across the link 915 to the personal electronic device 900 that the wireless audio device 300 is, itself, capable of receiving and audibly outputting audio having multiple audio channels, despite the fact that the wireless audio device 300 is incapable of audibly outputting any audio. In essence, the wireless audio device 300 plays the role of arranging the transmission of audio by the personal electronic device 900 entirely for the benefit of the wireless audio devices 100a and 100b. During the resulting transmission of audio by the personal electronic device 900 including multiple channels, all three of the wireless audio devices 100a, 100b and 300 receive all of the multiple channels, but the wireless audio device 300 ignores this audio data while each of the wireless audio devices 100a and 100b make use of only the one or more audio channels that are of use to each.

The links 115a and 115b may or may not require similar link establishment procedures to be formed. This will depend on the degree to which the wireless audio devices 100a, 100b and 300 may be received by a user as already configured to locate each other and interact with each other, and/or the degree to which each has been configured to employ a simplified link establishment procedure. Not unlike the links 115 of the networks 1000 and 2000, the links 115a and 115b are used to coordinate various aspects of the transfer of audio from the personal electronic device 900 and to the wireless audio devices 100a, 100b and 300, including and not limited to, synchronizing timings, exchanging volume and various audio signal processing settings, sharing data to implement noise cancellation functions, and conveying decryption keys. By way of example, where the control 322 of the wireless audio device 300 is employed as a volume control, the resulting remote control commands may be conveyed via the links 115a and 115b to the wireless audio devices 100a and 100b, respectively.

Additionally, the link 915 is able to be used in the transfer of audio detected with a microphone from the wireless audio device 300 to the personal electronic device 900. If the roles of the wireless audio devices 100 and 200 are reversed such that either of the wireless audio devices 100a or 100b are in direct communication with the personal electronic device 900 through the link 915, then audio from the wireless audio device 300 detected with a microphone would have to be relayed through another wireless audio device to reach the personal electronic device 900.

Where the wireless audio device 200 incorporates the depicted control 322, and the control 322 is configured to send remote control commands to the personal electronic device 900 when manually operated, the link 915 is employed to convey those remote control commands from the wireless audio device 300 to the personal electronic device 900. Where either of the wireless audio devices 100a or 100b incorporate a manually-operated control (not shown), and that control is configured to send remote control commands to the personal electronic device 900 when manually operated, the links 115a and 115b, respectively, are employed to convey those remote control commands from the wireless audio devices 100a and 100b to the wireless audio device 300, which forwards those commands onward to the personal electronic device 900 via the link 915.

Where the wireless audio device 300 incorporates the indicator 323 enabling non-audio data to be displayed to a user, and that indicator is configured to be used to display data received from the personal electronic device 900, that data is conveyed to the wireless audio device 300 via the link 915. Where either of the wireless audio devices 100a or 100b incorporate an indicator (also not shown) enabling non-audio data to be displayed to a user, and that indicator is configured to be used to display data received from the personal electronic device 900, that data is conveyed to the wireless audio device 300 via the link 915. However, just as in the case of audio data, the non-audio data is also received by the wireless audio devices 100a and 100b, directly, by "listening in" on information transferred by the personal electronic device 900 across the link 915.

Figure 6:
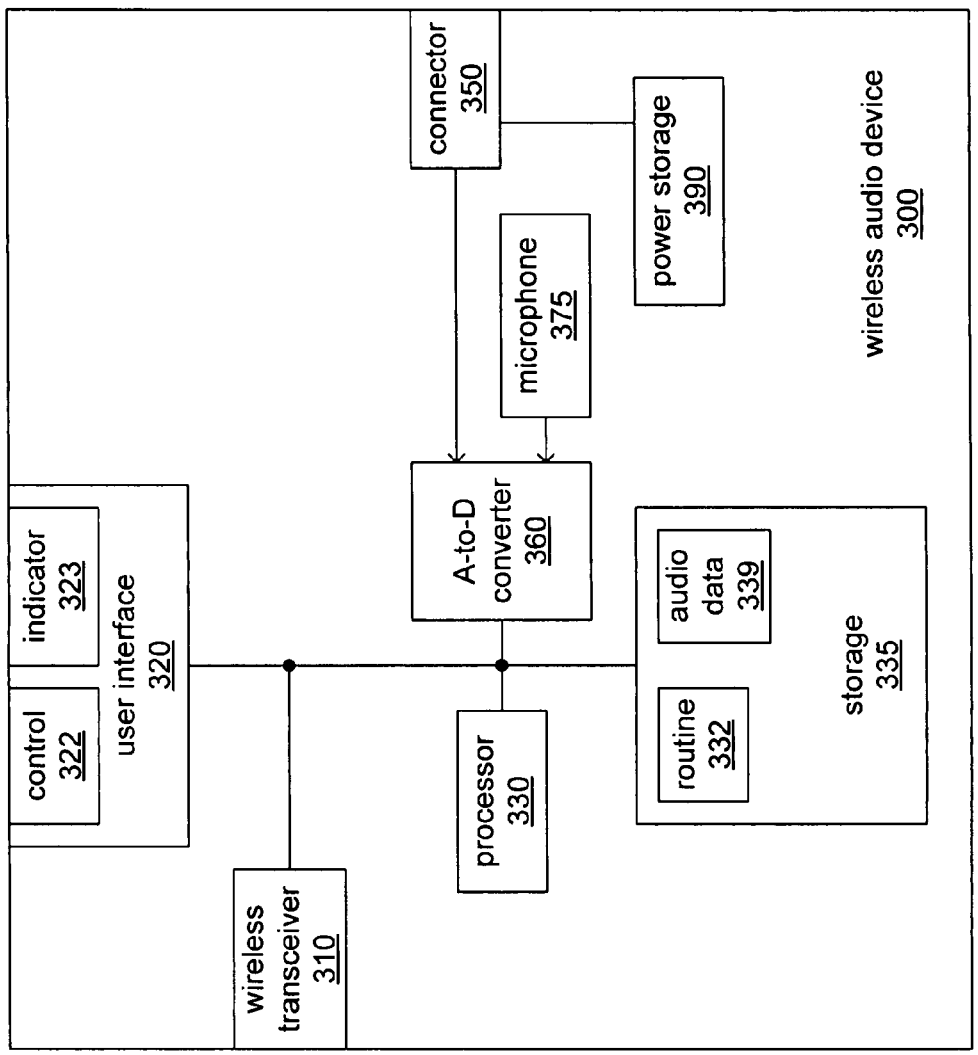
FIG. 6 is a block diagram of a wireless audio device of FIG. 5.

FIG. 6 is a block diagram of one possible internal architecture of the wireless audio device 300 of FIG. 5. The wireless audio device 300 incorporates a wireless transceiver 310, a user interface 320, a processor 330, a storage 335, a connector 350, an analog-to-digital (A-to-D) converter 360, perhaps a microphone 375 and a power storage 390 storing and providing electrical power to the rest of these. The architecture of the wireless audio device 300 depicted in FIG. 6 is substantially similar to the architecture of the wireless audio device 200 depicted in FIG. 4 with the substantial difference being the removal of a few components to support audibly outputting audio. Indeed, where substantially similar components performing substantially similar functions exist, they have been designated with labels in which the last two digits are identical to ease between them. Regardless of the exact architecture employed, the processor 330 is provided access to at least the wireless transceiver 310, the user interface 320, the storage 335 and the A-to-D converter 360. As will be explained in greater detail, the processor 330 accesses the storage 335 to retrieve a sequence of instructions making up a routine 332, and in executing the routine 332, the processor 330 is caused to perform various functions during the operation of the wireless audio device 300.

The processor 330 may be any of a variety of types of processing device, and the storage 335 may be based on any of a wide variety of information storage technologies. The storage 335 stores at least the routine 332, and depending on what audio processing and/or audio buffering functions are caused by the routine 332 to be performed by the processor 330, the storage 335 may also store an audio data 339.

At a minimum, the execution of the routine 332 causes the processor 330 to operate the wireless transceiver 310 to send audio detected with a microphone to a personal electronic device (either directly or relayed), and to perhaps engage in exchanging commands and/or non-audio data. Where a wireless point-to-point link between the wireless audio device 300 and another device at least partly conforms to the Bluetooth specification or a similar specification for point-to-point wireless communication, the processor 330 may be caused by the routine 332 to operate the wireless transceiver 310 to carry out a link establishment procedure to establish that point-to-point link. The processor 330 may be further caused to operate the wireless transceiver 310 to exchange information concerning functional capabilities between the wireless audio device 300 and another device. Where the given role of the wireless audio device 300 is to engage a personal electronic device in direct two-way communications (as was the case with the wireless audio device 300 in FIG. 5), then as previously discussed, the wireless audio device transmits false information about its own function capabilities to induce the wireless device to enable the use of various protocols and/or data formats to be used in communicating audio having multiple audio channels.

The user interface 320 incorporates one or both of the previously-discussed control 322 and indicator 323. The control 322 may be any type of manually-operable control and the indicator 323 may be any of a number of possible devices conveying information to a user of the wireless audio device 300. The control 322 may be employed by a user of the wireless audio device 300 for one or more of initiating the performance of some form of link establishment procedure, controlling one or more aspects of the provision of audio to a user, and remotely controlling another wireless device with which a point-to-point link is formed. The indicator 323 may be employed to display information received by the wireless transceiver 310 from another wireless device and/or information generated by the wireless audio device 300, itself.

The A-to-D converter 360 may be of any of a wide variety of designs and forms. The A-to-D converter 360 may be accessible by the processor 330 to enable the processor 330 to operate either to support differing timings, audio bit formats, etc. The connector 350, at a minimum, enables an external power source to be connected to the wireless audio device 300, and may enable that external power source to recharge the power storage 390. In various embodiments, the connector 350 may enable audio detected by an external microphone to be provided to the A-to-D converter 360 where either the wireless device 300 does not incorporate the microphone 375, or a user desires to use an external microphone in place of or in addition to the microphone 375. Also, as an alternative to or in addition to using multiple electrically-conductive contacts for conveying at least power and perhaps also commands and other data, the connector 350 may incorporate non-electrically-conductive approaches to conveying power, audio, commands and/or other data.

As previously discussed, a link establishment procedure may be required to form the point-to-point link, and a user of both the wireless audio device 300 and another device (such as a personal electronic device or another wireless audio device) may operate both devices to initiate a link establishment procedure between them. For the wireless audio 300, this may entail the processor 330 being caused by the routine 332 to monitor the control 322 for an instance of the control 322 being operated by the user to initiate the link establishment procedure, and then operating the transceiver 310 to carry out the link establishment procedure. As already discussed, where the other device with which the wireless audio device 300 has formed a given link is a personal electronic device from which audio having multiple audio channels is to be received, then the processor 330 may be caused by the routine 332 to operate the transceiver 310 to provide the other device with a false indication that the wireless audio device 300 is capable of both receiving and audibly outputting multiple audio channels of a piece of audio having multiple audio channels, despite this not being true.

With the point-to-point link established and initialized, the processor 330, in executing the routine 332, is caused by the routine 332 to operate the wireless transceiver 310 to transmit audio detected by a microphone. Audio detected by one or both of the microphone 375 (if present) and an external microphone connected to the connector 350 is provided to the A-to-D converter 360. Then, the processor 330 is further caused to transfer audio from the A-to-D converter 360 to the transceiver. The processor 330 may be further caused to buffer the audio to be transmitted through the transceiver 310 as the audio data 339 stored within the storage 335.

Where the wireless audio device supports it, the establishment and initialization of the point-to-point link also enables the transfer of commands and/or non-audio data across that point-to-point link. Commands to remotely control the wireless audio device 300 may emanate from either a personal electronic device that also transmits audio or another wireless audio device. Similarly, commands emanating from the wireless audio device 300 may control one or both of a personal electronic device and another wireless audio device. Other forms of data may similarly emanate from a personal electronic device and/or another wireless audio device.

As previously discussed, more than one wireless audio device must cooperate to receive and use multiple audio channels of audio that a personal audio device transmits to one of those wireless audio devices. Not unlike what has been previously discussed, such coordination is enabled through the formation of additional wireless point-to-point links formed between the wireless audio devices (e.g., the links 115a and 115b between the wireless audio devices 100a and 100b in FIG. 5). Across that link may be transmitted authentication, identification and/or decryption information needed for wireless audio devices to receive and use the transmissions of multi-channel audio and other data, as well as audio synchronization signals remote control commands, and indications of errors from packets of audio not received or received with corrupted audio data.

Despite the wireless audio device 300 not being capable of audibly outputting audio, the processor 330 is caused by the routine 332 to generate a synchronization signal, or to perhaps receive and relay a synchronization signal to enable other wireless audio devices to synchronize their audible audio output. Further, the processor 330 is caused to operate the transceiver 310 to pass on commands, non-audio data and/or error indications as needed between other devices where needed, and to buffer those commands, non-audio data and/or error indications where needed in the storage 335.

Figure 7:
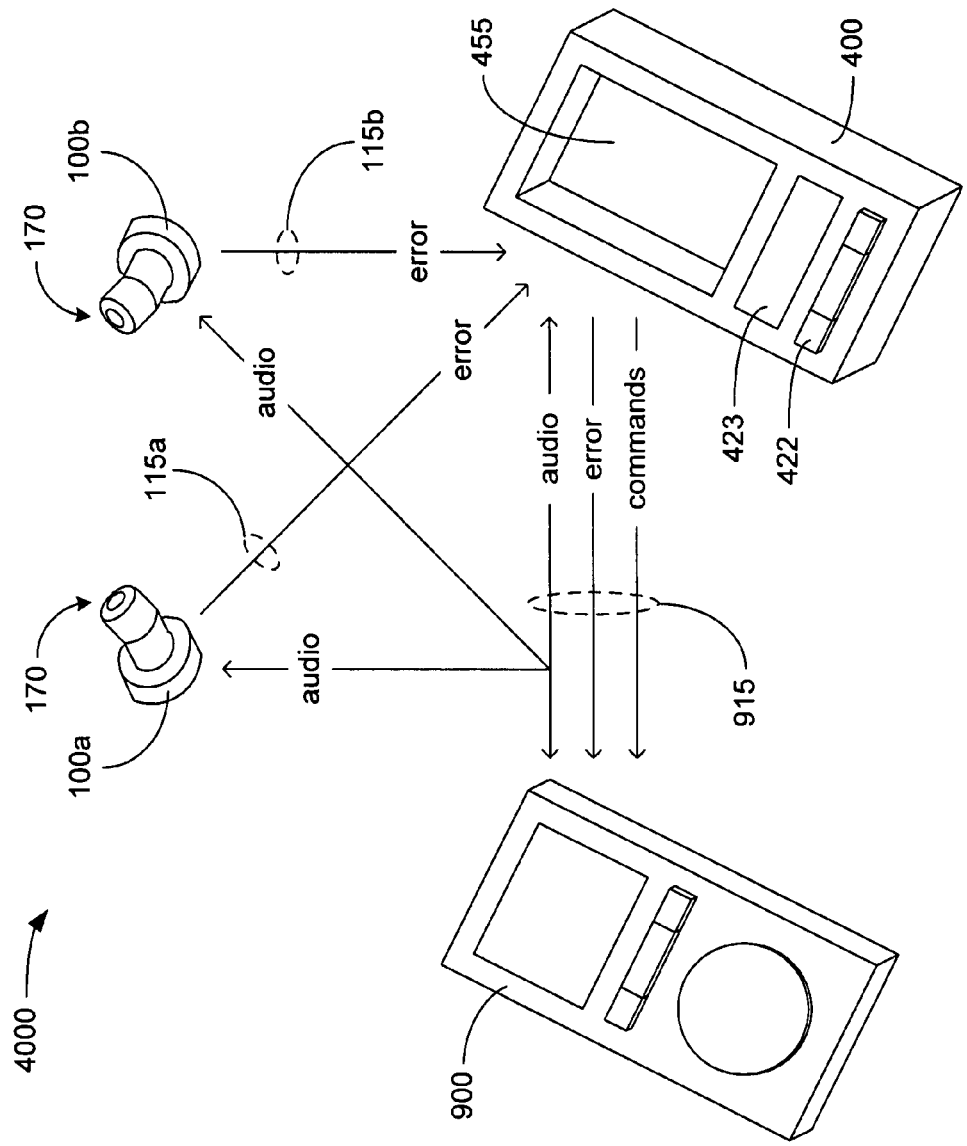
FIG. 7 is yet another block diagram of a wireless network incorporating multiple wireless audio devices and a personal electronic device.

FIG. 7 depicts a network 4000 in which audio is transferred among four personal electronics devices, specifically, a personal electronic device 900 and a triplet of wireless audio devices 100a, 100b and 400. The network 4000 is substantially similar to the network 3000 of FIG. 5, being a pseudo hub-and-spoke topology in which the personal electronic device 900 is presented with false indications of being in wireless communications to transfer audio solely with a single wireless audio device (the wireless audio device 400, as depicted) across a single wireless point-to-point link 915, but with the purpose of inducing the personal electronic device 900 to also transfer the audio to at least one other wireless audio device (the wireless audio devices 100a and 100b, as depicted). Indeed, where possible, many of the same numeric labels have been used between the FIGS. 5 and 7 depictions of the networks 3000 and 4000, respectively, where there are substantial similarities. Also, the wireless audio device 400 is substantially similar to the wireless audio device 300 of FIG. 5, being a wireless audio device that is unable to audibly output audio, and may also be capable of exchanging remote control commands and/or non-audio data. The most substantial difference between the networks 3000 and 4000 is that the wireless audio device 400, unlike the wireless audio device 300, is incapable of detecting audio with a microphone in order to transmit that audio to another device. Indeed, not unlike the network 1000 of FIG. 1, within the network 4000, as depicted, is only the ability to audibly output audio, and not to detect audio.

The wireless audio device 400 occupies the same role as the wireless audio devices 100a, 200 and 300 of the networks 1000, 2000 and 3000, respectively, in forming the link 915 with the personal electronic device 900 and in providing a false indication of capabilities to the personal electronic device 900 to induce the personal electronic device 900 to transmit multiple-channel audio across the link 915. Like the wireless audio device 300 of the network 3000, wireless audio device 400 is essentially arranging for the personal electronic device 900 to transmit audio to other wireless audio devices, since the wireless audio device 400 does not audibly output audio. However, unlike the wireless audio device 300, the wireless audio device 400 does not detect audio with a microphone, either. Therefore, whatever audible outputting or detecting of audio is to occur in any network employing the wireless audio device 400 in this capacity will have to rely on other wireless audio devices to perform those functions. It should be noted that in other embodiments, the roles of the wireless audio devices 100a, 100b and 400 could be switched such that one of the wireless audio devices 100a or 100b has the direct two-way communication through the link 915 with the personal electronic device 200, and given the lack of audio outputting and detecting functionality of the wireless audio device 400, such a switch could likely be made without adversely affecting the overall cooperative functionality achieved among all of the devices of the network 4000.

Although the wireless audio device 300 is depicted as being in a box-like form that might be strapped to a belt or worn about the neck as a pendant, this is intended to be illustrative of one form of device, and the wireless audio device 400 could be of any of a number of types of devices. The wireless audio device 400 incorporates one or both of a manually-operable control 422 and an indicator 423. Where the wireless audio device 400 incorporates the control 422, the control 422 may be operable to enable a user to remotely control the personal electronic device 900 and/or one or both of the wireless audio devices 100a and 100b. Where the wireless audio device 300 incorporates an indicator, the indicator may enable non-audio data to be displayed to a user.

In a manner very much like what has been previously discussed, the wireless audio devices 100a, 100b and 400 cooperate to present the personal electronic device 900 with the appearance of forming the link 915 with only a single other device (namely the wireless audio device 400) to which the personal electronic device 900 transmits a piece of audio. Though all three of the wireless audio devices 100a, 100b and 400 receive signals from the personal electronic device 900, only one of the wireless audio devices transmits to the personal electronic device 900 (i.e., the wireless audio device 400, as depicted).

While the personal electronic device 900 transmits the piece of audio across the link 915 to the wireless audio device 400, the wireless audio devices 100a and 100b also picks up the same signal and receive the same piece of audio despite neither being the intended recipient. Despite receiving packets of audio from the personal electronic device 900, the wireless audio device 400 ignores them since it has no ability to drive an acoustic driver to audibly output audio. Where a packet of digitized audio is either not received or is received as corrupted by one or both of the wireless audio devices 100a and 100b, one or both transmits an error signal across corresponding links 115a and 115b to the wireless audio device 400 to be forwarded on to the personal electronic device 900 across the link 915 to cause the packet to be retransmitted. The link 915 may also be used by the wireless audio device 400 to transmit remote control commands back to the personal electronic device 900. Where either of the wireless audio devices 100a or 100b is caused by a user to generate remote control commands, those commands are transmitted across the links 115a and 115b, respectively to be forwarded to the personal electronic device 900 across the link 915.

Not unlike the wireless audio devices 100a, 200 and 300 of FIGS. 1, 3 and 5, respectively, the wireless audio device 400 provides a false indication across the link 915 to the personal electronic device 900 that the wireless audio device 400 is, itself, capable of receiving and audibly outputting audio having multiple audio channels, despite the fact that the wireless audio device 400 is incapable of audibly outputting any audio. In essence, the wireless audio device 400 plays the role of arranging the transmission of audio by the personal electronic device 900 entirely for the benefit of the wireless audio devices 100a and 100b. During the resulting transmission of audio by the personal electronic device 900 including multiple channels, all three of the wireless audio devices 100a, 100b and 400 receive all of the multiple channels, but the wireless audio device 400 ignores this audio data while each of the wireless audio devices 100a and 100b make use of only the one or more audio channels that are of use to each.

The links 115a and 115b may or may not require similar link establishment procedures to be formed. This will depend on the degree to which the wireless audio devices 100a, 100b and 400 may be received by a user as already configured to locate each other and interact with each other, and/or the degree to which each has been configured to employ a simplified link establishment procedure. Not unlike the links 115 of the networks 1000 and 2000, the links 115a and 115b are used to coordinate various aspects of the transfer of audio from the personal electronic device 900 and to the wireless audio devices 100a, 100b and 400, including and not limited to, synchronizing timings, exchanging volume and various audio signal processing settings, sharing data to implement noise cancellation functions, and conveying decryption keys. By way of example, where the control 422 of the wireless audio device 400 is employed as a volume control, the resulting remote control commands may be conveyed via the links 115a and 115b to the wireless audio devices 100a and 100b, respectively.

Where the wireless audio device 400 incorporates the depicted control 422, and the control 422 is configured to send remote control commands to the personal electronic device 900 when manually operated, the link 915 is employed to convey those remote control commands from the wireless audio device 400 to the personal electronic device 900. Where either of the wireless audio devices 100a or 100b incorporate a manually-operated control (not shown), and that control is configured to send remote control commands to the personal electronic device 900 when manually operated, the links 115a and 115b, respectively, are employed to convey those remote control commands from the wireless audio devices 100a and 100b to the wireless audio device 400, which forwards those commands onward to the personal electronic device 900 via the link 915.

Where the wireless audio device 400 incorporates the indicator 423 enabling non-audio data to be displayed to a user, and that indicator is configured to be used to display data received from the personal electronic device 900, that data is conveyed to the wireless audio device 400 via the link 915. Where either of the wireless audio devices 100a or 100b incorporate an indicator (also not shown) enabling non-audio data to be displayed to a user, and that indicator is configured to be used to display data received from the personal electronic device 900, that data is conveyed to the wireless audio device 400 via the link 915. However, just as in the case of audio data, the non-audio data is also received by the wireless audio devices 100a and 100b, directly, by "listening in" on information transferred by the personal electronic device 900 across the link 915.

Figure 8:
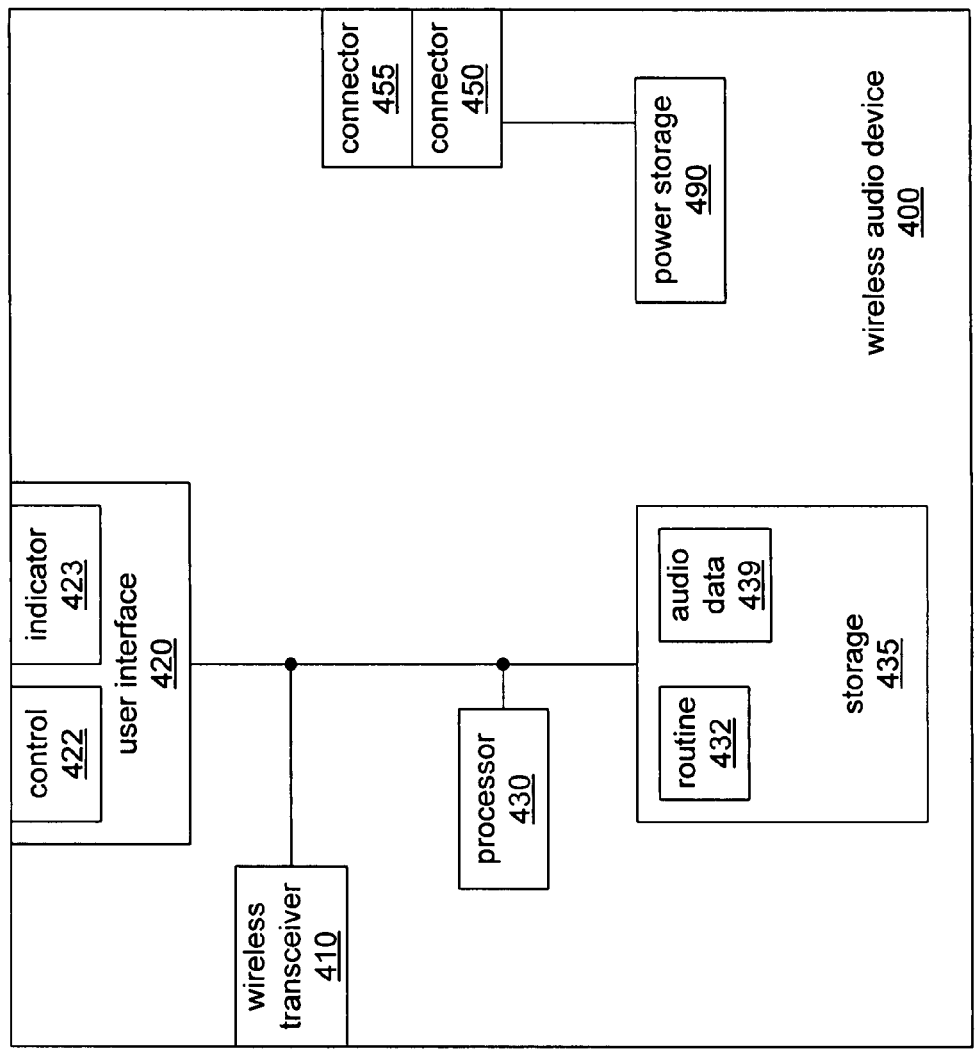
FIG. 8 is a block diagram of a wireless audio device of FIG. 7.

FIG. 8 is a block diagram of one possible internal architecture of the wireless audio device 400 of FIG. 7. The wireless audio device 400 incorporates a wireless transceiver 410, a user interface 420, a processor 430, a storage 435, a connector 450, another connector as part of a cradle 455, and a power storage 490 storing and providing electrical power to the rest of these. The architecture of the wireless audio device 400 depicted in FIG. 8 is substantially similar to the architecture of the wireless audio device 300 depicted in FIG. 6 with the substantial difference being the removal of a few components to support the detection of audio by a microphone for transmission. Indeed, where substantially similar components performing substantially similar functions exist, they have been designated with labels in which the last two digits are identical to ease between them. Regardless of the exact architecture employed, the processor 430 is provided access to at least the wireless transceiver 410, the user interface 420, and the storage 435. As will be explained in greater detail, the processor 430 accesses the storage 435 to retrieve a sequence of instructions making up a routine 432, and in executing the routine 432, the processor 430 is caused to perform various functions during the operation of the wireless audio device 400.

The processor 430 may be any of a variety of types of processing device, and the storage 435 may be based on any of a wide variety of information storage technologies. The storage 435 stores at least the routine 432, and depending on what audio processing and/or audio buffering functions are caused by the routine 432 to be performed by the processor 430, the storage 435 may also store an audio data 439.

At a minimum, the execution of the routine 432 causes the processor 430 to engage in exchanging commands and/or non-audio data, and perhaps to control the recharging of one or more other wireless audio devices inserted into the cradle 455. Where a wireless point-to-point link between the wireless audio device 400 and another device at least partly conforms to the Bluetooth specification or a similar specification for point-to-point wireless communication, the processor 430 may be caused by the routine 432 to operate the wireless transceiver 410 to carry out a link establishment procedure to establish that point-to-point link. The processor 430 may be further caused to operate the wireless transceiver 410 to exchange information concerning functional capabilities between the wireless audio device 400 and another device. Where the given role of the wireless audio device 400 is to engage a personal electronic device in direct two-way communications (as was the case with the wireless audio device 400 in FIG. 7), then as previously discussed, the wireless audio device transmits false information about its own function capabilities to induce the wireless device to enable the use of various protocols and/or data formats to be used in communicating audio having multiple audio channels.

The user interface 420 incorporates one or both of the previously-discussed control 422 and indicator 423. The control 422 may be any type of manually-operable control and the indicator 423 may be any of a number of possible devices conveying information to a user of the wireless audio device 400. The control 422 may be employed by a user of the wireless audio device 400 for one or more of initiating the performance of some form of link establishment procedure, controlling one or more aspects of the provision of audio to a user, and remotely controlling another wireless device with which a point-to-point link is formed. The indicator 423 may be employed to display information received by the wireless transceiver 410 from another wireless device and/or information generated by the wireless audio device 400, itself (e.g., an indication of the progress of recharging a wireless audio device inserted into the cradle 455).

Although the connector 450 may conventionally employ multiple electrically-conductive contacts for conveying at least power and perhaps also commands and other data, the connector 450 may incorporate non-electrically-conductive approaches to conveying power, audio, commands and/or other data. Both the connector 450 and a connector incorporated into the cradle 455 are connected to the power storage 490. Through the connector 450, the power storage 490 may be charged from an external power source, and through the connector incorporated into the cradle 455, one or more other wireless devices inserted into the cradle 455 may be recharged using electrical power either from the power storage 490 or from an external power source connected to the connector 450. The processor 430 may be further caused by the routine 432 to monitor the recharging of the power storage 490 and/or of a wireless audio device inserted into the cradle 455 to prevent overcharging.

As previously discussed, a link establishment procedure may be required to form the point-to-point link, and a user of both the wireless audio device 400 and another device (such as a personal electronic device or another wireless audio device) may operate both devices to initiate a link establishment procedure between them. For the wireless audio 400, this may entail the processor 430 being caused by the routine 432 to monitor the control 422 for an instance of the control 422 being operated by the user to initiate the link establishment procedure, and then operating the transceiver 410 to carry out the link establishment procedure. As already discussed, where the other device with which the wireless audio device 400 has formed a given link is a personal electronic device from which audio having multiple audio channels is to be received, then the processor 430 may be caused by the routine 432 to operate the transceiver 410 to provide the other device with a false indication that the wireless audio device 400 is capable of both receiving and audibly outputting multiple audio channels of a piece of audio having multiple audio channels, despite this not being true.

Despite the lack of ability of the wireless audio device 400 to either audibly output audio or to use a microphone to detect audio, the processor 430 may be caused by the routine relay audio between two other devices having point-to-point links formed with the wireless audio device 400. Furthermore, the processor 430 may be further caused to buffer relayed audio as the audio data 439 stored within the storage 435, and/or to carry out various signal processing operations on audio relayed through the wireless audio device 400.

Where the wireless audio device supports it, the establishment and initialization of the point-to-point link also enables the transfer of commands and/or non-audio data across that point-to-point link. Commands to remotely control the wireless audio device 400 may emanate from either a personal electronic device that also transmits audio or another wireless audio device. Similarly, commands emanating from the wireless audio device 400 may control one or both of a personal electronic device and another wireless audio device. Other forms of data may similarly emanate from a personal electronic device and/or another wireless audio device.

As previously discussed, more than one wireless audio device must cooperate to receive and use multiple audio channels of audio that a personal audio device transmits to one of those wireless audio devices. Not unlike what has been previously discussed, such coordination is enabled through the formation of additional wireless point-to-point links formed between the wireless audio devices (e.g., the links 115a and 115b between the wireless audio devices 100a and 100b in FIG. 7). Across that link may be transmitted authentication, identification and/or decryption information needed for wireless audio devices to receive and use the transmissions of multi-channel audio and other data, as well as audio synchronization signals remote control commands, and indications of errors from packets of audio not received or received with corrupted audio data.

Despite the wireless audio device 400 not being capable of audibly outputting audio, the processor 430 is caused by the routine 432 to generate a synchronization signal, or to perhaps receive and relay a synchronization signal to enable other wireless audio devices to synchronize their audible audio output. Further, the processor 430 is caused to operate the transceiver 410 to pass on commands, non-audio data and/or error indications as needed between other devices where needed, and to buffer those commands, non-audio data and/or error indications where needed in the storage 435.

Other embodiments are within the scope of the following claims.

What is claimed is:

1. An apparatus comprising:
 a processor;
 a transceiver accessible to the processor and configured to engage in wireless communications with a first wireless device;
 a storage accessible to the processor and having a routine stored therein comprising a sequence of instructions that when executed by the processor causes the processor to:
  induce the first wireless device to transmit a piece of audio-related data to the apparatus across a first wireless link formed between the apparatus and the first wireless device by operating the transceiver to transmit to the first wireless device across the first wireless link a false indication that the apparatus is capable of performing at least one audio function requiring receipt of the piece of audio-related data from the first wireless device, wherein the apparatus is not capable of performing the at least one audio function;
  operate the transceiver to receive the piece of audio-related data from the first wireless device across the first wireless link; and
  operate the transceiver to wirelessly communicate with a second wireless device through a second wireless link formed between the apparatus and the second wireless device to coordinate a substantially simultaneous receipt of the piece of audio-related data from the first wireless device by both the apparatus and the second wireless device, wherein:
   the apparatus receives the piece of audio-related data from the first wireless device across the first wireless link;
   the second wireless device receives the piece of audio-related data directly from the first wireless device; and
   no indication is provided to the first wireless device that the second wireless device is receiving the piece of audio-related data directly from the first wireless device.

2. The apparatus of claim 1, wherein:
 the piece of audio-related data is a piece of audio having first and second audio channels;

the at least one audio function comprises audibly outputting both the first and second audio channels of the piece of audio;
the apparatus audibly outputs the first audio channel; and
the second wireless device audibly outputs the second audio channel.

3. The apparatus of claim 2, wherein the apparatus and the second wireless device are each an earphone.

4. The apparatus of claim 1, wherein the piece of audio-related data is a piece of textual data related to a piece of audio, and wherein the at least one audio function is displaying the piece of textual data.

5. The apparatus of claim 1, wherein the at least one audio function is detecting a piece of audio with a microphone and transmitting the detected piece of audio to the first wireless device.

6. The apparatus of claim 1, wherein:
the processor is further caused to operate the transceiver to transmit information concerning the first wireless link to the second wireless device through the second wireless link to enable the substantially simultaneous receipt of the piece of audio-related data by the second wireless device directly from the first wireless device; and
wherein the information concerning the first wireless link is selected from a group consisting of an identity code and a decryption key.

7. The apparatus of claim 2, wherein the processor is further caused to operate the transceiver to exchange a signal with the second wireless device through the second wireless link to synchronize audible playback of the first and second audio channels of the piece of audio between the apparatus and the second wireless device.

8. The apparatus of claim 1, wherein the processor is further caused to operate the transceiver to signal the first wireless device through the first wireless link to retransmit the piece of audio-related data in response to receiving from the second wireless device through the second wireless link an indication of an error in the substantially simultaneous receipt of the piece of audio-related data by the second wireless device directly from the first wireless device.

9. The apparatus of claim 1, wherein the processor is further caused to operate the transceiver to wirelessly communicate with a third wireless device to form a third wireless link between the apparatus and the third wireless device, and to coordinate a substantially simultaneous receipt of the piece of audio-related data by the third wireless device directly from the first wireless device as the apparatus receives the piece of audio-related data directly from the first wireless device across the first wireless link and the second wireless device receives the piece of audio-related data directly from the first wireless device.

10. The apparatus of claim 9, wherein:
the piece of audio-related data is a piece of audio having first and second audio channels; and
the processor is further caused to operate the transceiver to exchange signals with the second and third wireless devices through the second and third wireless links, respectively, to synchronize audible playback of the first audio channel by the second wireless device with the audible playback of the second audio channel by the third wireless device.

11. The apparatus of claim 10, wherein the second and third wireless devices are each an earphone.

12. The apparatus of claim 10, wherein the processor is further caused to operate the transceiver to receive the piece of audio from the first wireless device and to ignore the piece of audio such that the apparatus receives the piece of audio from the first wireless device without audibly outputting the piece of audio.

13. An apparatus comprising:
a processor;
a transceiver accessible to the processor and configured to engage in wireless communications with a first wireless device;
a storage accessible to the processor and having a routine stored therein comprising a sequence of instructions that when executed by the processor causes the processor to:
operate the transceiver to form a first wireless link between the apparatus and the first wireless device;
operate the transceiver to receive an indication through the first wireless link from the first wireless device that the first wireless device has successfully induced a second wireless device to transmit a piece of audio-related data by transmitting through a second wireless link formed between the first and second wireless devices a false indication to the second wireless device that the first wireless device is capable of performing at least one audio function requiring receipt of the piece of audio-related data by the first wireless device from the second wireless device through the second wireless link, wherein the first wireless device is not capable of performing the at least one audio function;
operate the transceiver to receive information from the first wireless device through the first wireless link concerning the second wireless link formed between the first and second wireless devices that enables the apparatus to also receive the piece of audio-related data directly from the second wireless device substantially simultaneously with the first wireless device as the second wireless device transmits the piece of audio-related data to the first wireless device across the second wireless link; and
operate the transceiver to receive the piece of audio-related data directly from the second wireless device substantially simultaneously with the first wireless device as the second wireless device transmits the piece of audio-related data to the first wireless device through the second wireless link while providing no indication to the second wireless device that the apparatus is receiving the piece of audio-related data directly from the second wireless device.

14. The apparatus of claim 13, wherein:
the piece of audio-related data is a piece of audio; and
the processor is further caused to operate the transceiver to exchange a signal through the first wireless link with the first wireless device to synchronize audible playback of the piece of audio between the apparatus and the first wireless device.

15. The apparatus of claim 13, wherein:
the piece of audio-related data is a piece of audio;
the processor is further caused to operate the transceiver to exchange a signal through the first wireless link with the first wireless device to synchronize audible playback of the piece of audio between the apparatus and a third wireless device communicating with the first wireless device through a third wireless link formed between the first and third wireless devices; and
the third wireless device receives the piece of audio-related data directly from the second wireless device substantially simultaneously with the apparatus and the first wireless device.

16. A method comprising:
inducing a first wireless device to transmit a piece of audio-related data to an apparatus across a first wireless link formed between the apparatus and the first wireless device by transmitting to the first wireless device across the first wireless link a false indication that the apparatus is capable of performing at least one audio function requiring receipt of the piece of audio-related data from the first wireless device across the first wireless link, wherein the apparatus is not capable of performing the at least one audio function;
receiving the piece of audio-related data from the first wireless device across the first wireless link;
wirelessly communicating with a second wireless device through a second wireless link formed between the apparatus and the second wireless device to coordinate a substantially simultaneous receipt of the piece of audio-related data by the second wireless device directly from the first wireless device as the first wireless device transmits the piece of audio-related data to the apparatus through the first wireless link; and
providing no indication to the first wireless device that the second wireless device is also receiving the piece of audio-related data directly from the first wireless device as the apparatus substantially simultaneously receives the piece of audio-related data from the first wireless device through the first wireless link.

17. The method of claim 16, further comprising transmitting information concerning the first wireless link to the second wireless device through the second wireless link to enable the simultaneous receipt of the piece of audio-related data by the second wireless device directly from the first wireless device, wherein the information concerning the first wireless link is selected from a group consisting of an identity code and a decryption key.

18. The method of claim 16, wherein the piece of audio-related data is a piece of audio, and further comprising exchanging a signal with the second wireless device through the second wireless link to synchronize audible playback of the piece of audio between the apparatus and the second wireless device.

19. The method of claim 16, further comprising signaling the first wireless device through the first wireless link to retransmit the piece of audio-related data in response to receiving from the second wireless device an indication of an error in the substantially simultaneous receipt of the piece of audio-related data by the second wireless device directly from the first wireless device as the first wireless device previously transmitted the piece of audio-related data to the apparatus through the first wireless link.

20. The method of claim 16, further comprising wirelessly communicating with a third wireless device through a third wireless link formed between the apparatus and the third wireless device to coordinate a substantially simultaneous receipt of the piece of audio-related data by the third wireless device directly from the first wireless device as the apparatus receives the piece of audio-related data directly from the first wireless device through the first wireless link and the second wireless device receives the piece of audio-related data directly from the first wireless device.

21. The method of claim 20, wherein the piece of audio-related data is a piece of audio having first and second audio channels, and further comprising exchanging signals with the second and third wireless devices through the second and third wireless links, respectively, to synchronize audible playback of the first audio channel of the piece of audio by the second wireless device with the audible playback of the second audio channel by the third wireless device.

22. The method of claim 21, further comprising ignoring the piece of audio as received from the first wireless device across the first wireless link by the apparatus as by not audibly outputting the piece of audio.

* * * * *